July 14, 1942.  H. R. SCHUTZ  2,289,999
GLASS-WORKING MACHINE
Filed June 15, 1940  19 Sheets-Sheet 1
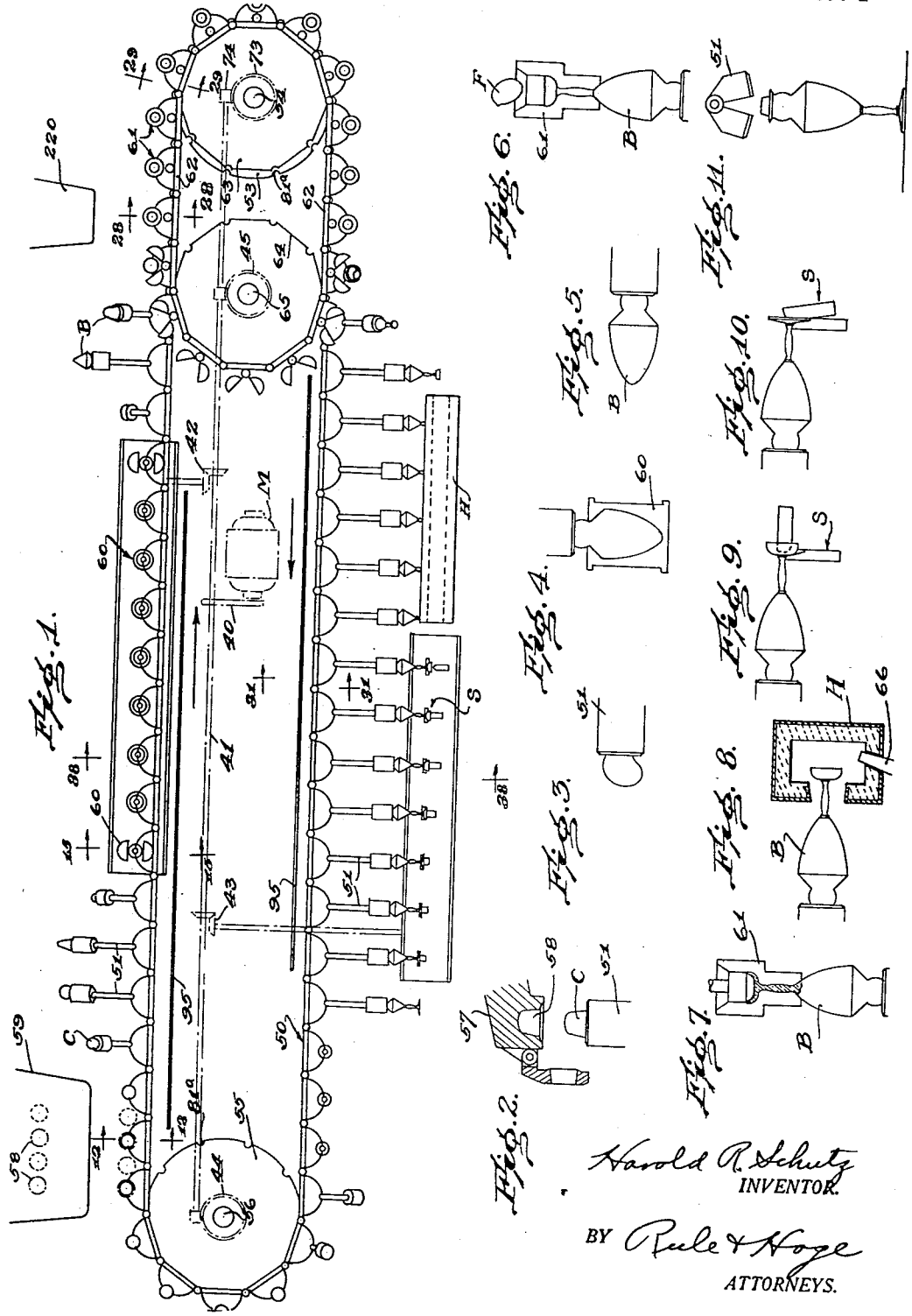

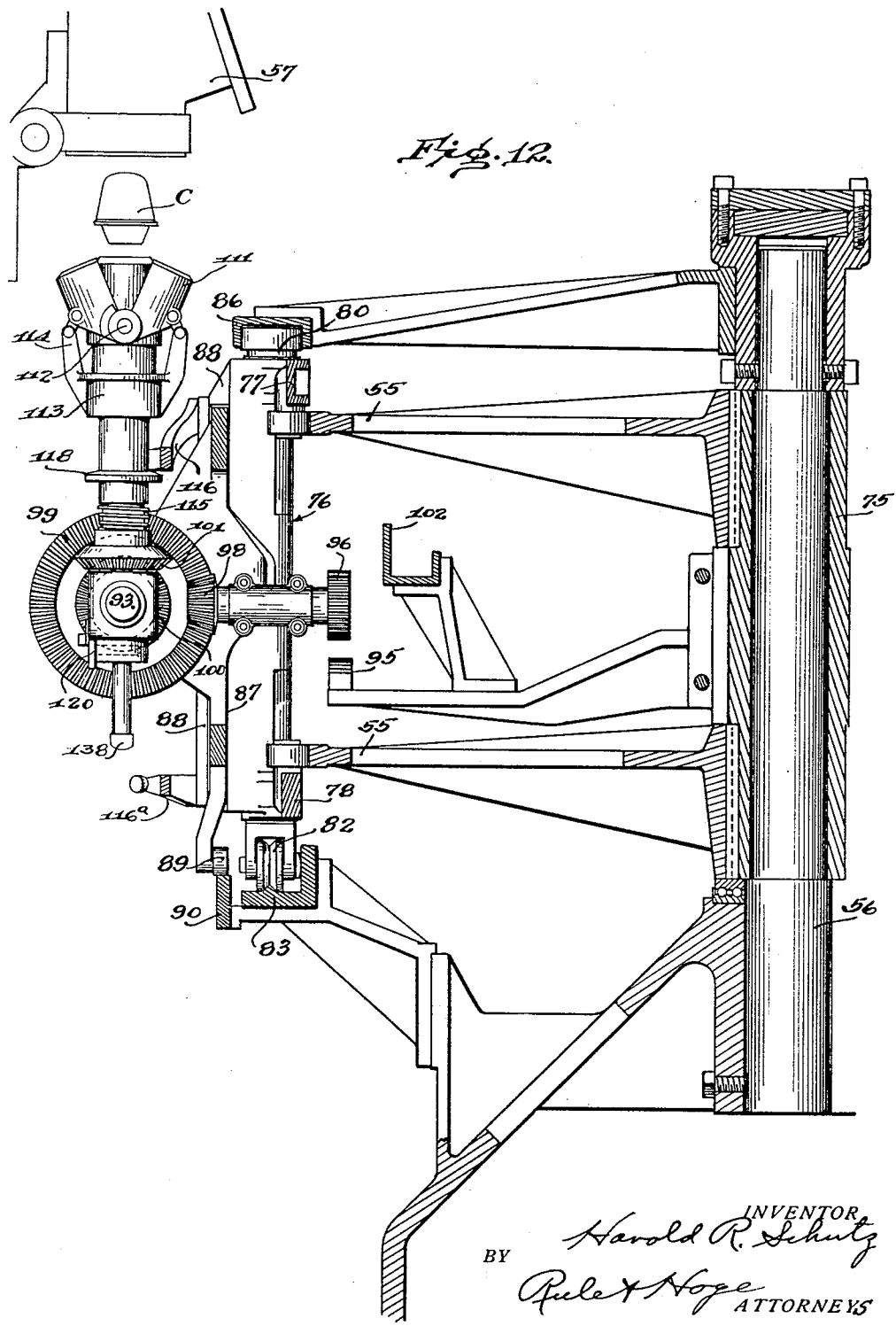

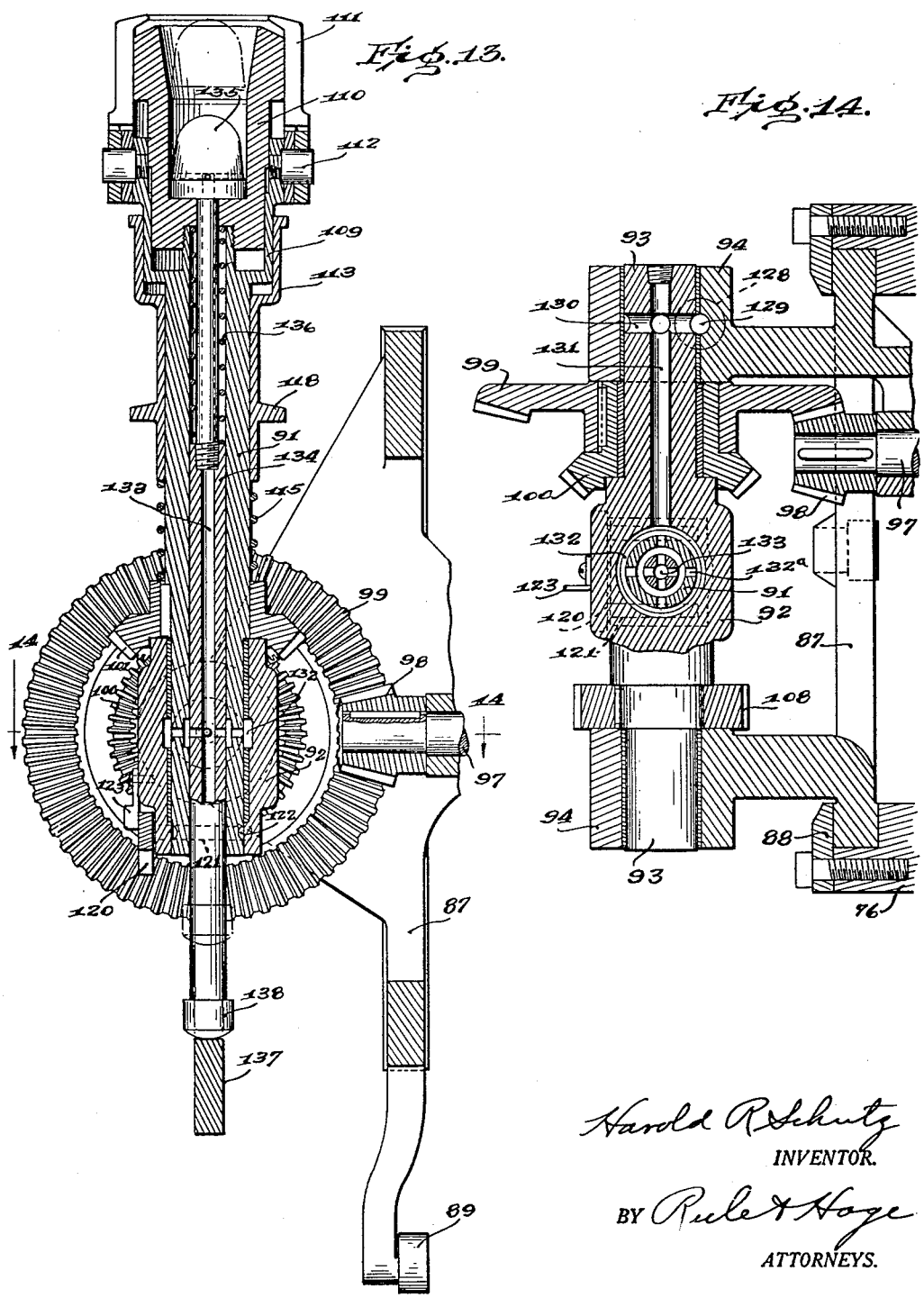

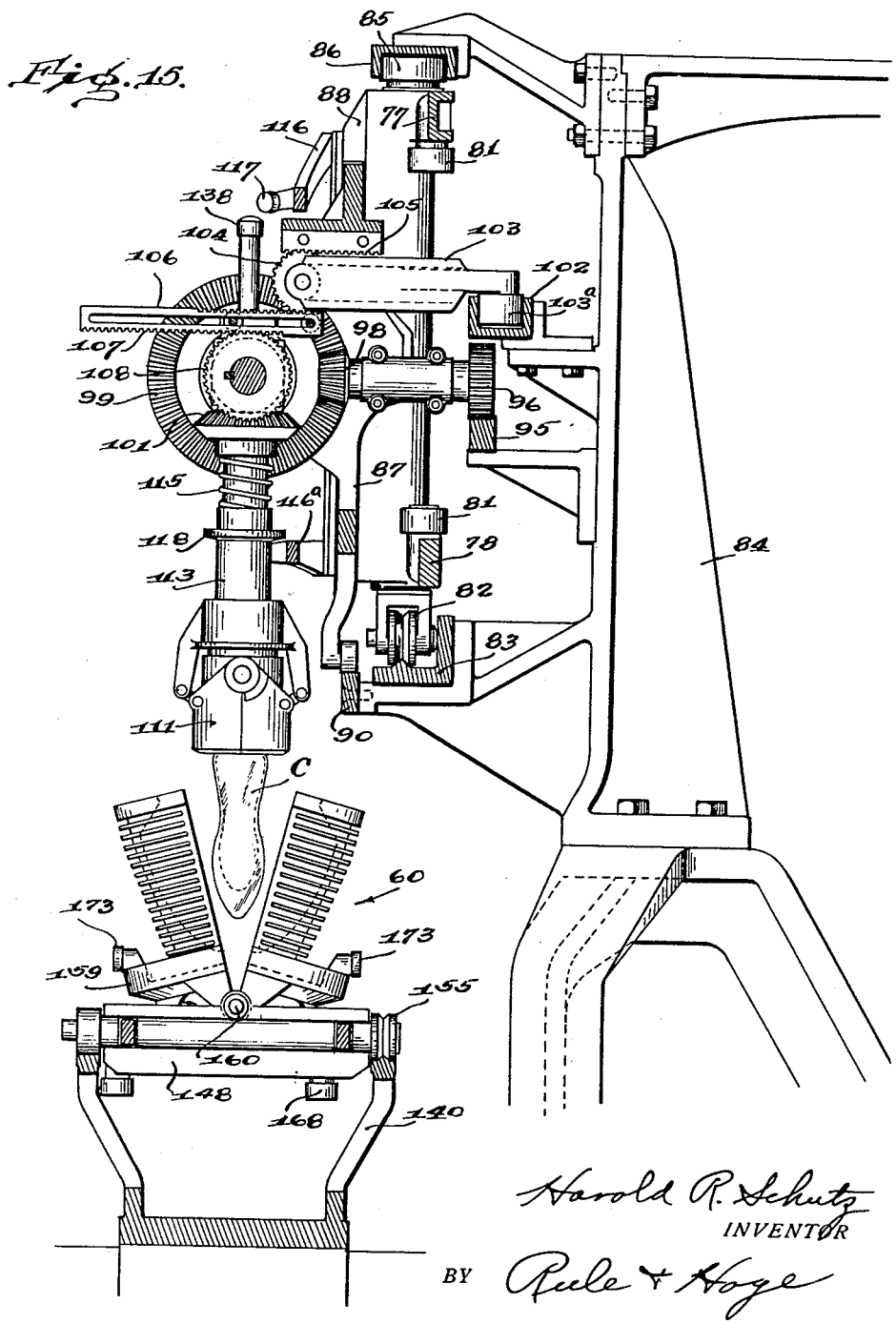

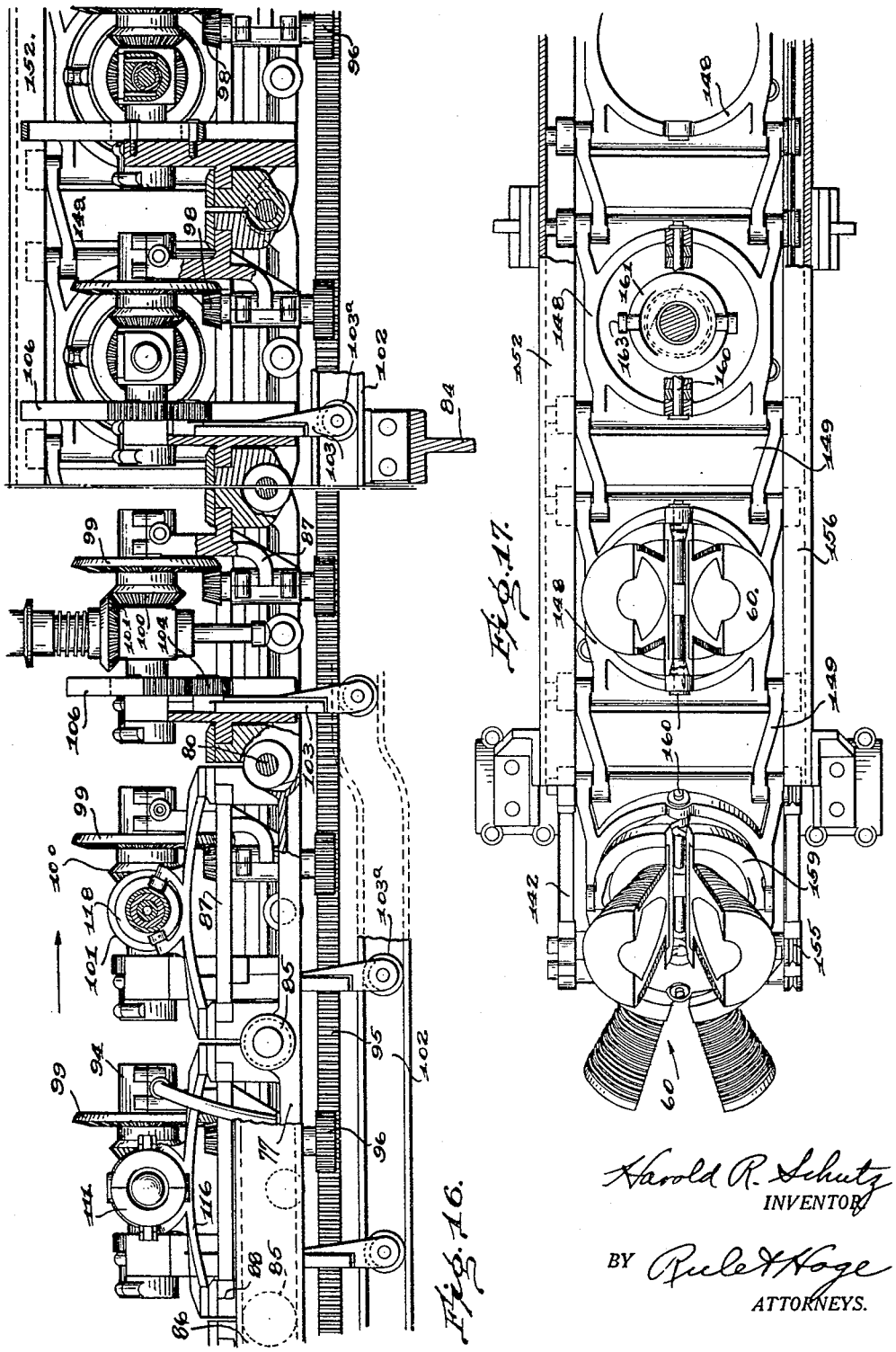

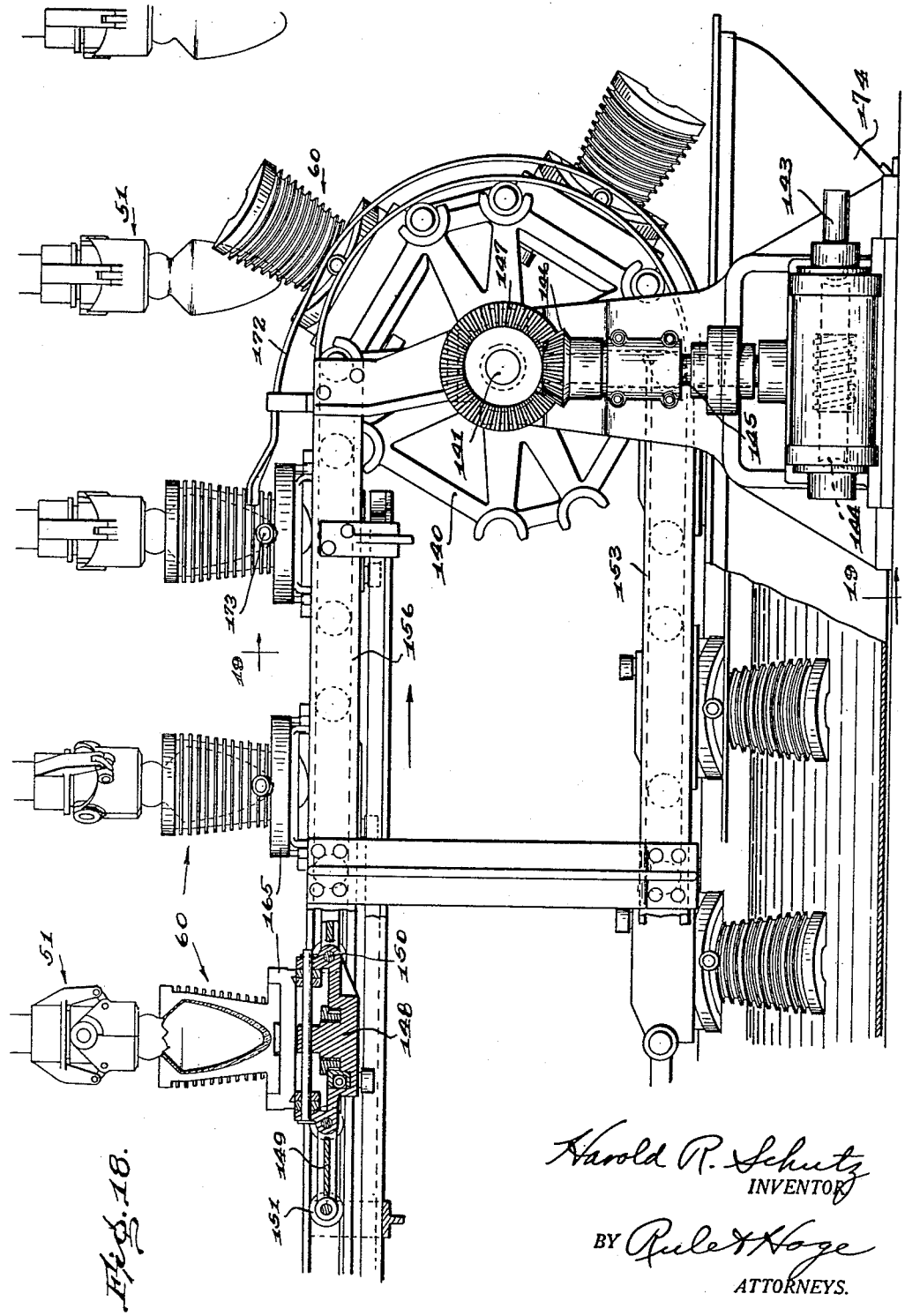

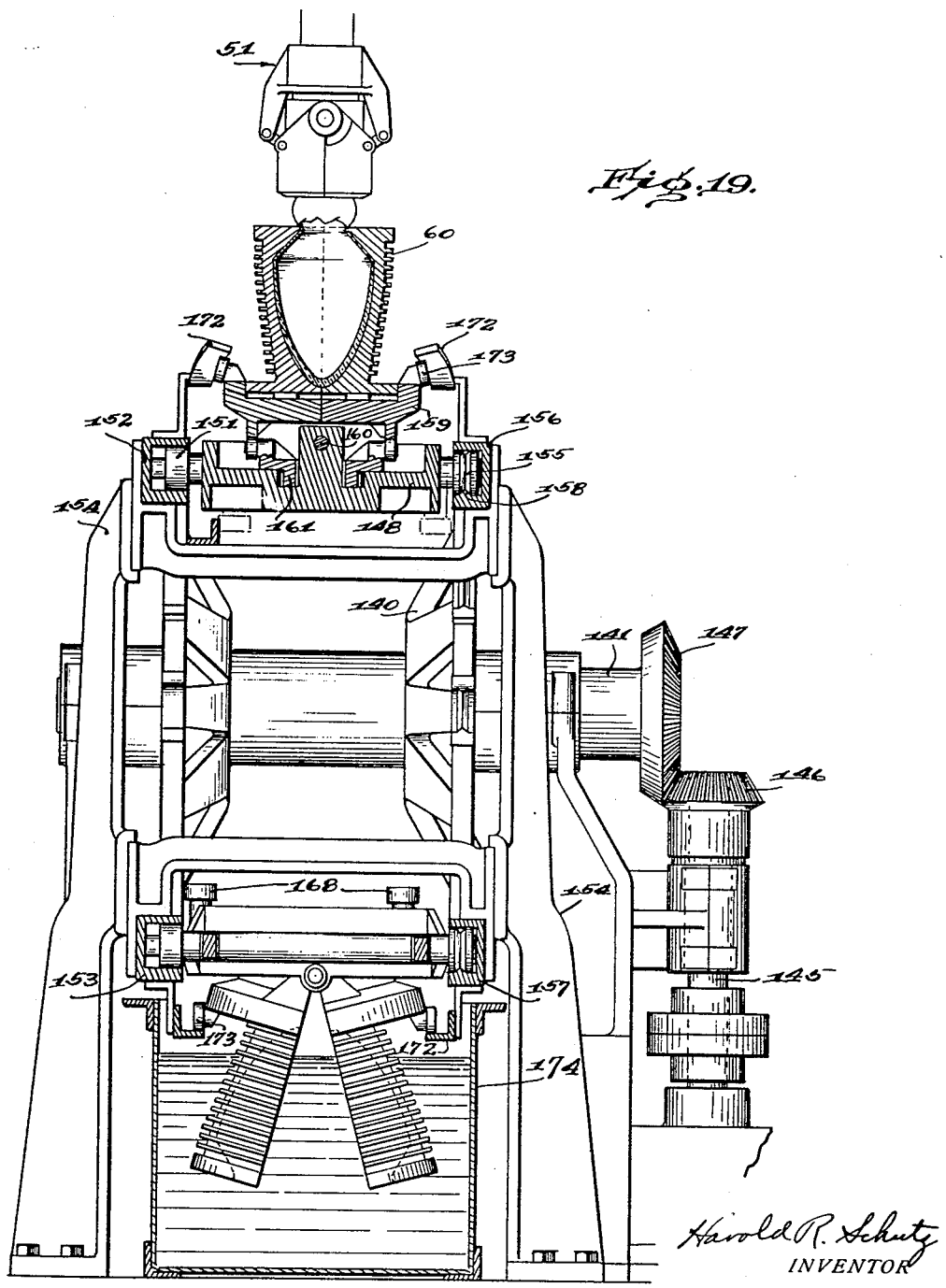

July 14, 1942.  H. R. SCHUTZ  2,289,999
GLASS-WORKING MACHINE
Filed June 15, 1940  19 Sheets-Sheet 8

Harold R. Schutz
INVENTOR
BY
ATTORNEYS.

July 14, 1942.  H. R. SCHUTZ  2,289,999
GLASS-WORKING MACHINE
Filed June 15, 1940  19 Sheets-Sheet 9

Harold R. Schutz
INVENTOR.
BY Rule & Hoge
ATTORNEYS.

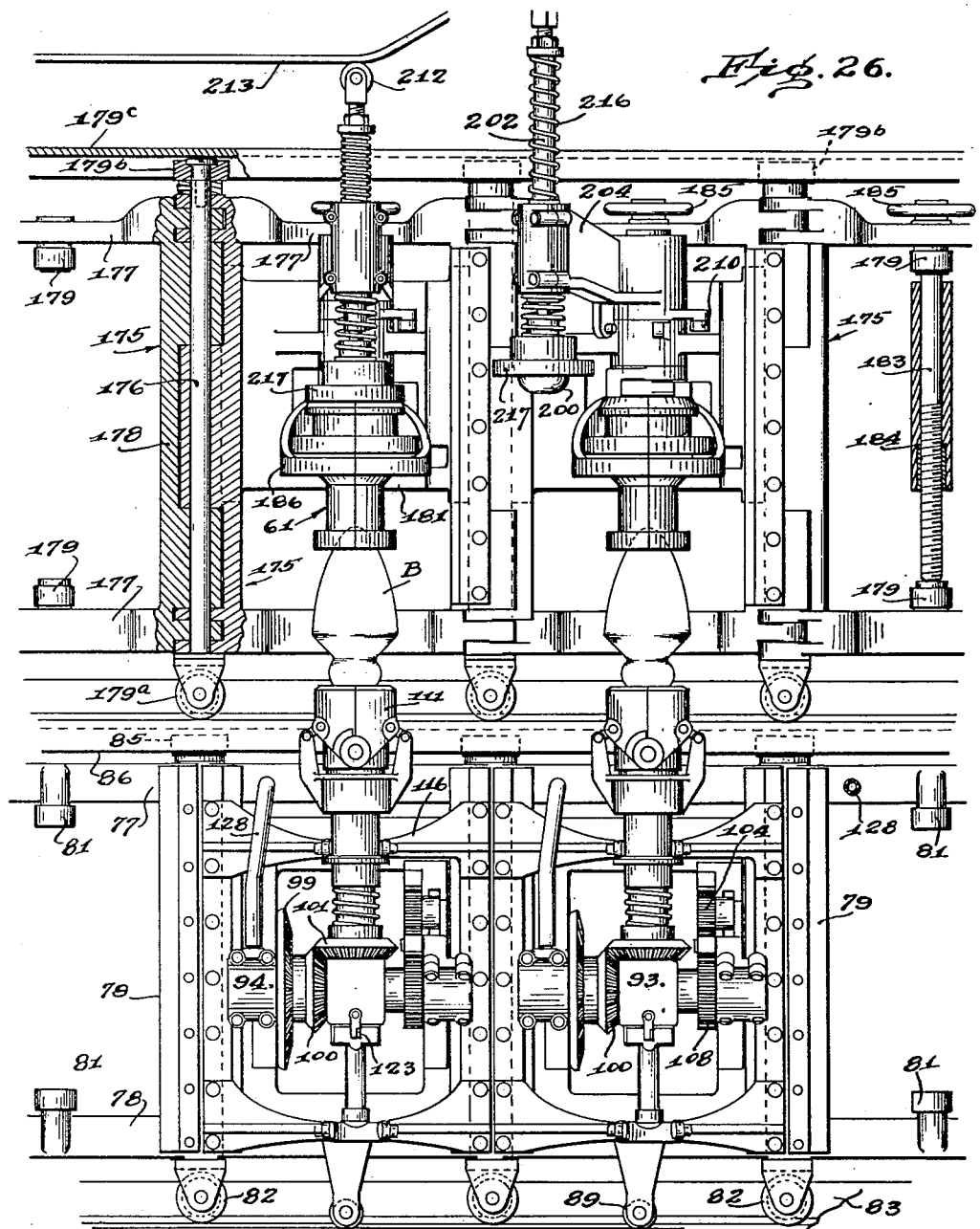

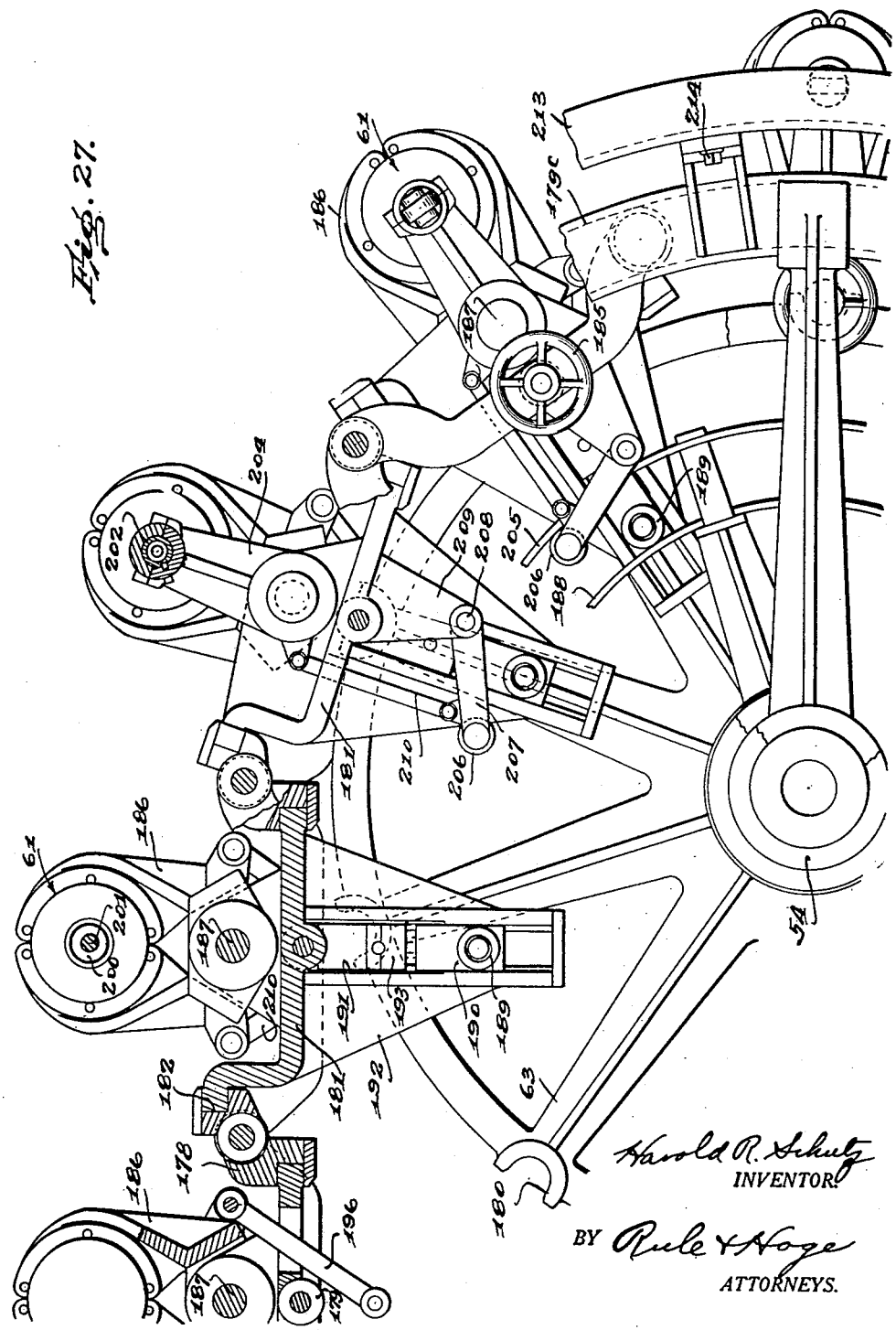

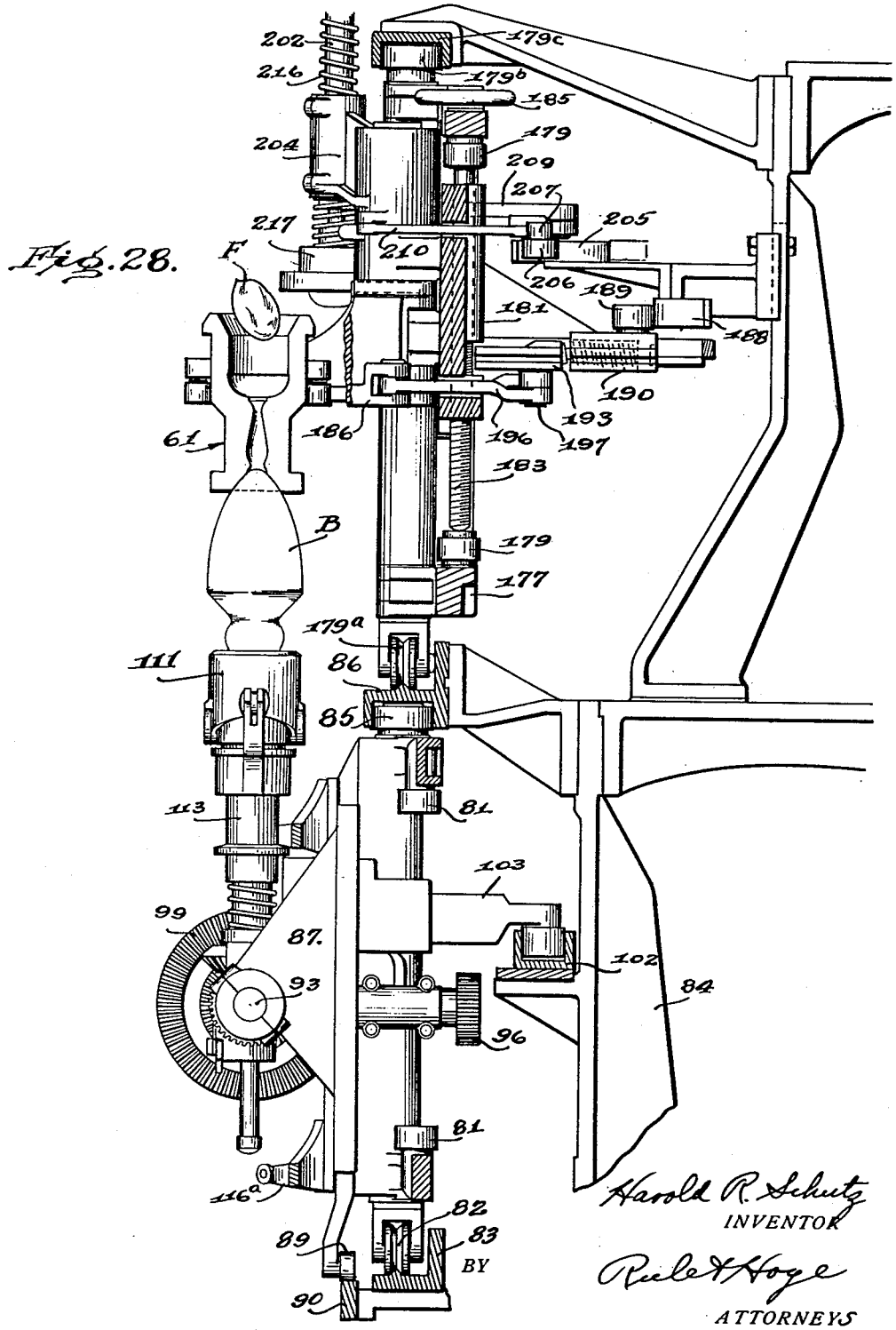

July 14, 1942.　　　H. R. SCHUTZ　　　2,289,999
GLASS-WORKING MACHINE
Filed June 15, 1940　　19 Sheets-Sheet 13
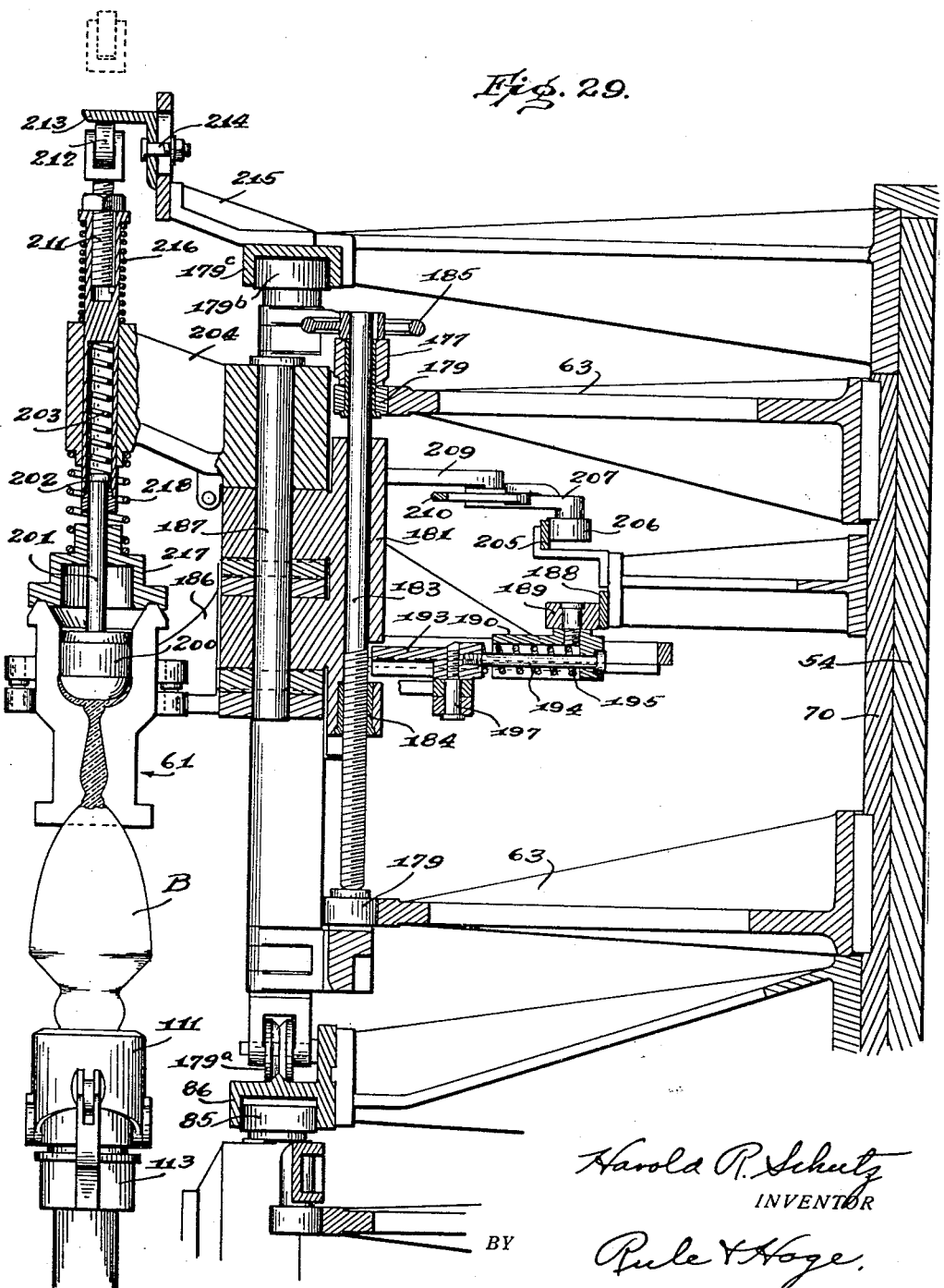

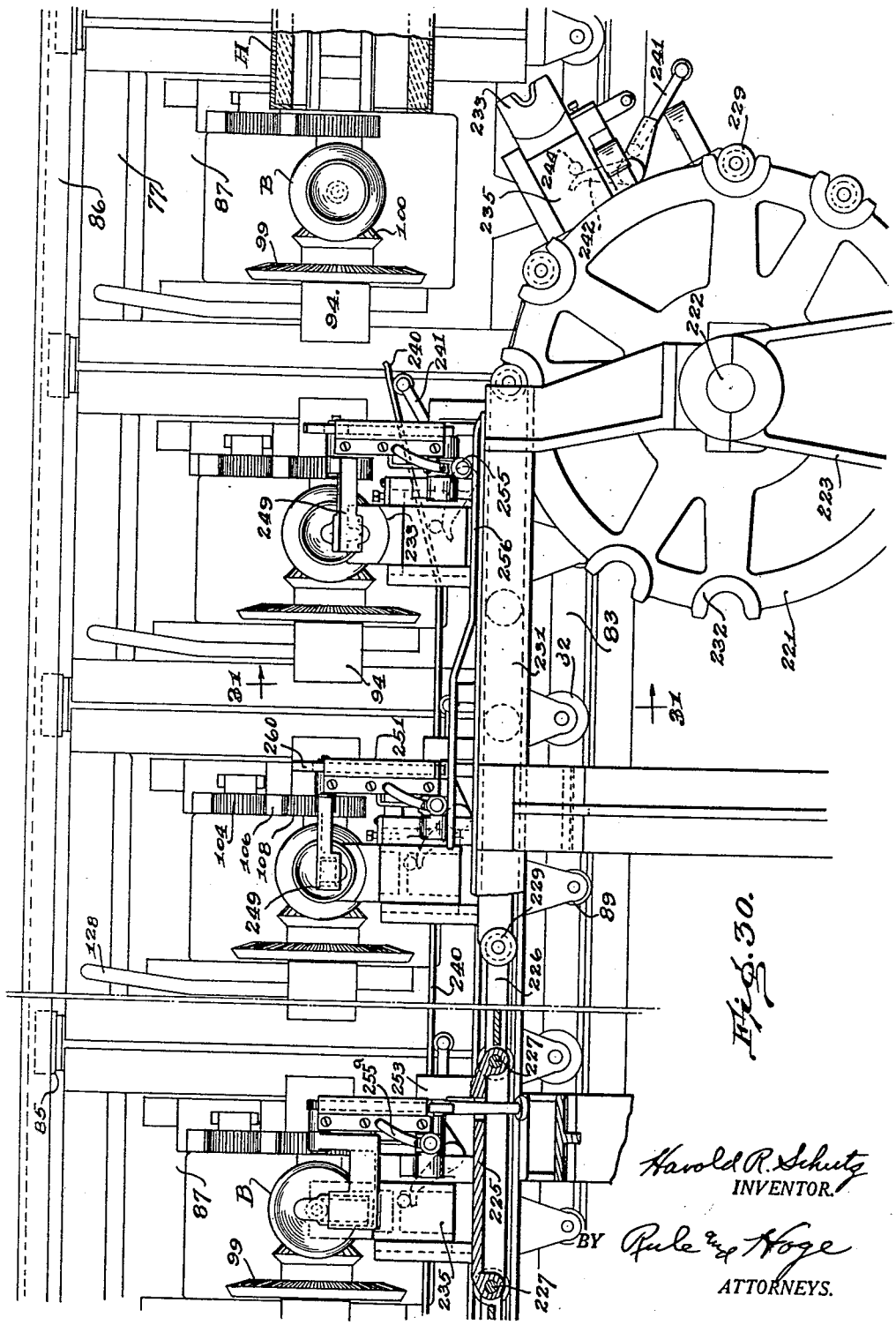

July 14, 1942. H. R. SCHUTZ 2,289,999
GLASS-WORKING MACHINE
Filed June 15, 1940 19 Sheets-Sheet 15
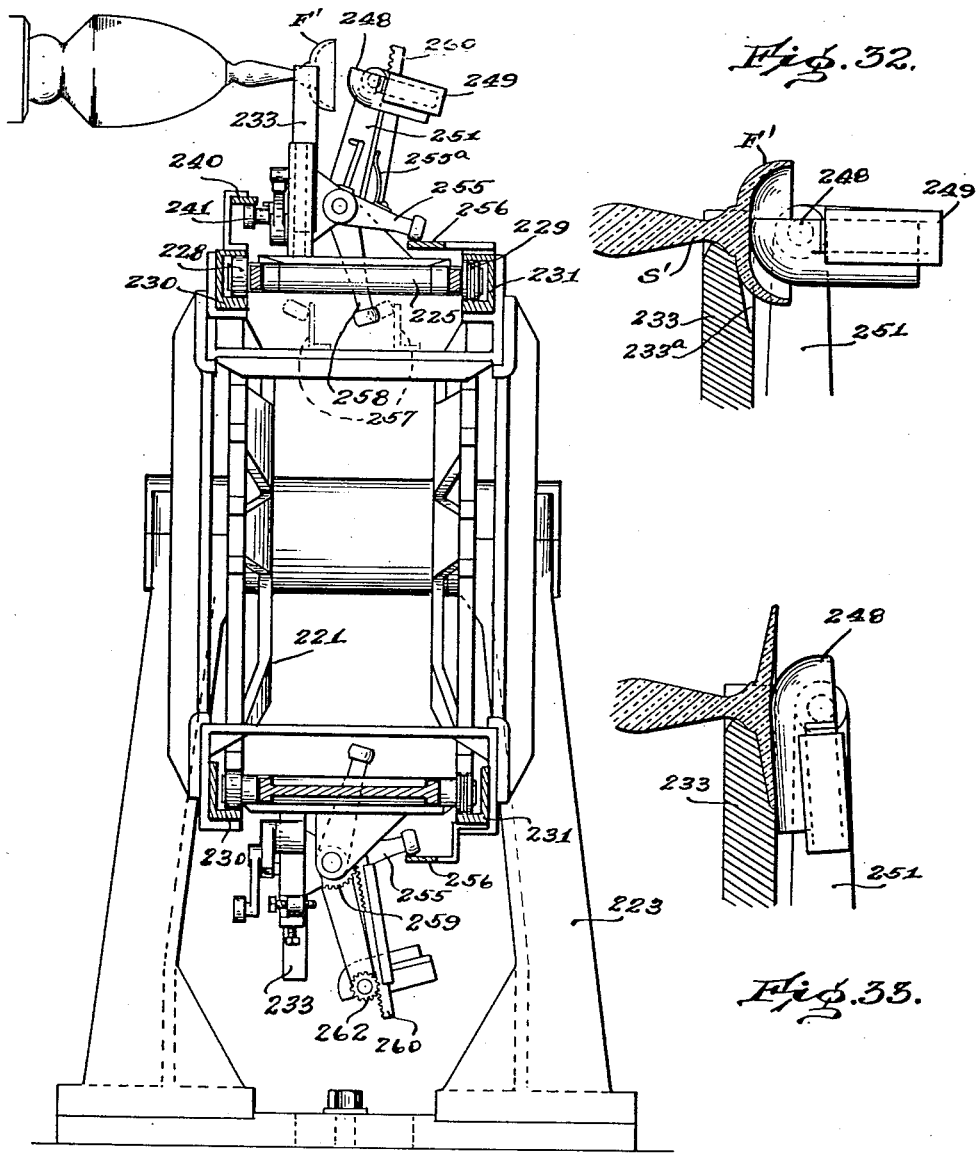

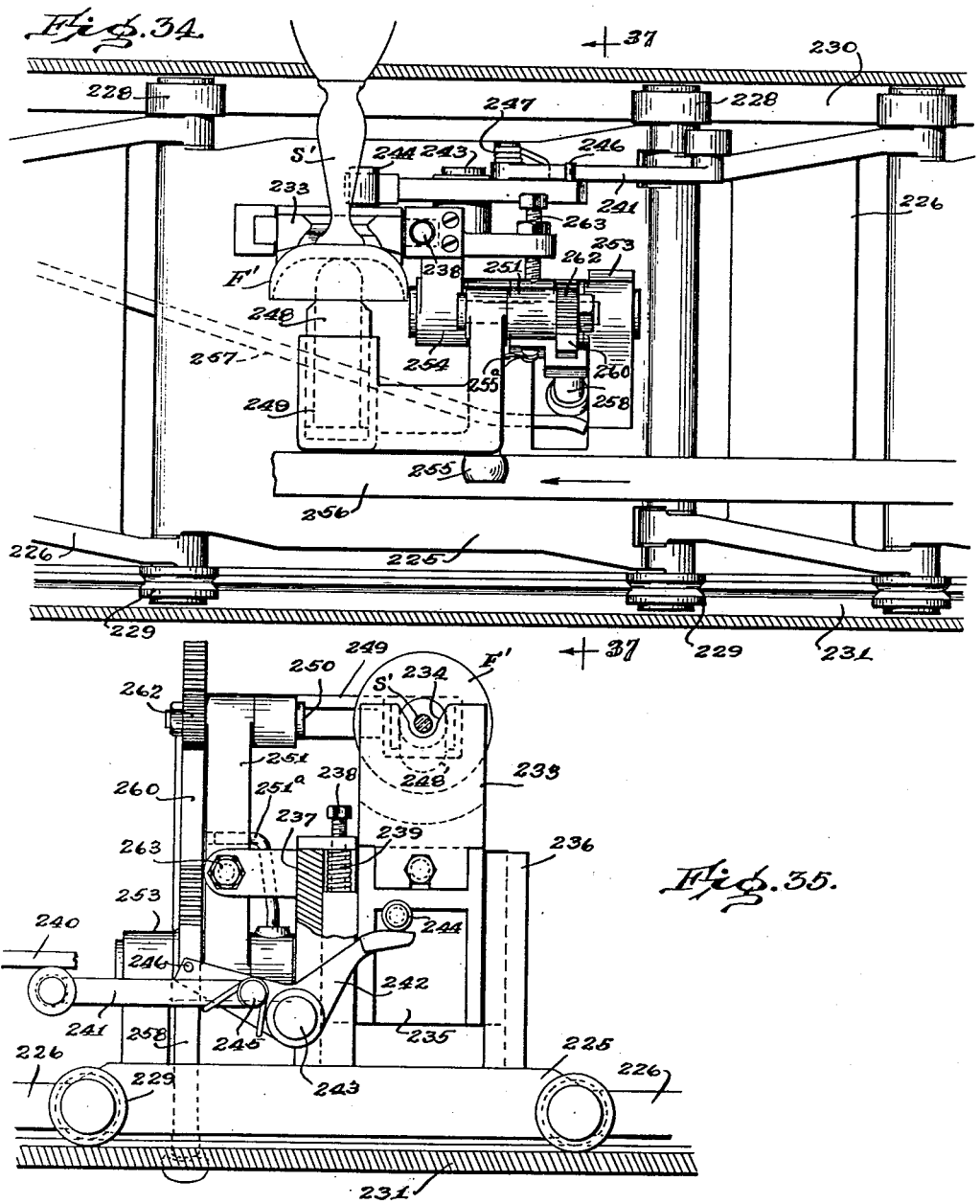

July 14, 1942.  H. R. SCHUTZ  2,289,999
GLASS-WORKING MACHINE
Filed June 15, 1940    19 Sheets-Sheet 17

Harold R. Schutz
INVENTOR.
BY Rule and Hoge
ATTORNEYS.

Patented July 14, 1942

2,289,999

UNITED STATES PATENT OFFICE 2,289,999

GLASS-WORKING MACHINE

Harold R. Schutz, Toledo, Ohio, assignor to Libbey Glass Company, a corporation of Ohio Application June 15, 1940, Serial No. 340,812

24 Claims. (Cl. 49—5)

My invention relates to a glassware forming machine of a continuously moving endless chain type and particularly to a machine of this type adapted to completely form footed tumblers or stemware during a cycle of operation thereof.

At the present day, footed tumblers and stemware generally are made largely by hand methods which involve a great amount of labor and time, making the production of the ware expensive. In keeping with general practice the hollow glass bowl of a tumbler is made by hand, then carried to a stem-forming machine usually located at some distance from where the bowl is blown. The foot or footed stem is then cast on the bowl by a pressing and molding operation which leaves the foot in the shape of a cup inverted with respect to the bowl. When the pressing operation has been completed, the ware is carried to a skilled operator for the foot-straightening operation which includes reheating the cup-shaped foot to soften the glass and thereafter, by hand manipulation, reshaping the foot to form a symmetrical base for the tumbler.

In modern practice these hand operations to some extent have been superseded by substituting automatic or semi-automatic machines for independently performing a number of successive operations, the ware being transferred manually from one machine which performs a particular operation to another machine for forming a different operation. These successive transfers result in a considerable loss of ware as well as increasing the cost of production, due to the amount of labor required for transferring the ware and feeding it to the various machines or units. The development of automatic take-out and transfer devices between these various units would be very expensive and complicated.

A primary object of the present invention is to provide an automatic machine by which the various operations required in the production of stemware are effected automatically and as a continuous process, thereby practically eliminating hand labor, greatly reducing costs and increasing the rate of production.

A further object of the invention is to provide an automatic machine or apparatus of the character indicated in which there is provided holding means for receiving a segregated charge or gob of glass which is to form the bowl of the article, and holding it throughout the series of operation involved in the development and molding the glass to form the bowl, forming the footed stem and casting it on the bowl, and reheating and reshaping the stem and foot to give final shape to the ware.

Other objects of the invention will appear hereinafter.

Referring to the accompanying drawings which illustrate an apparatus designed for making stemware and embodying the principle of my invention:

Fig. 1 is a diagrammatic plan view of the apparatus;

Figs. 2 to 11 inclusive are diagrammatic views illustrating successive steps in the cycle of operations as follows:

Fig. 2 illustrates the manner in which a charge or blank of molten glass is released from the gathering ram and transferred to a spindle of the forming machine;

Fig. 3 illustrates the open-air development of the blank by a usual method during inversion thereof;

Fig. 4 shows the blank blown to the finished shape of the bowl within a finished mold;

Fig. 5 shows the bowl while being reinverted for succeeding operations;

Figure 20:
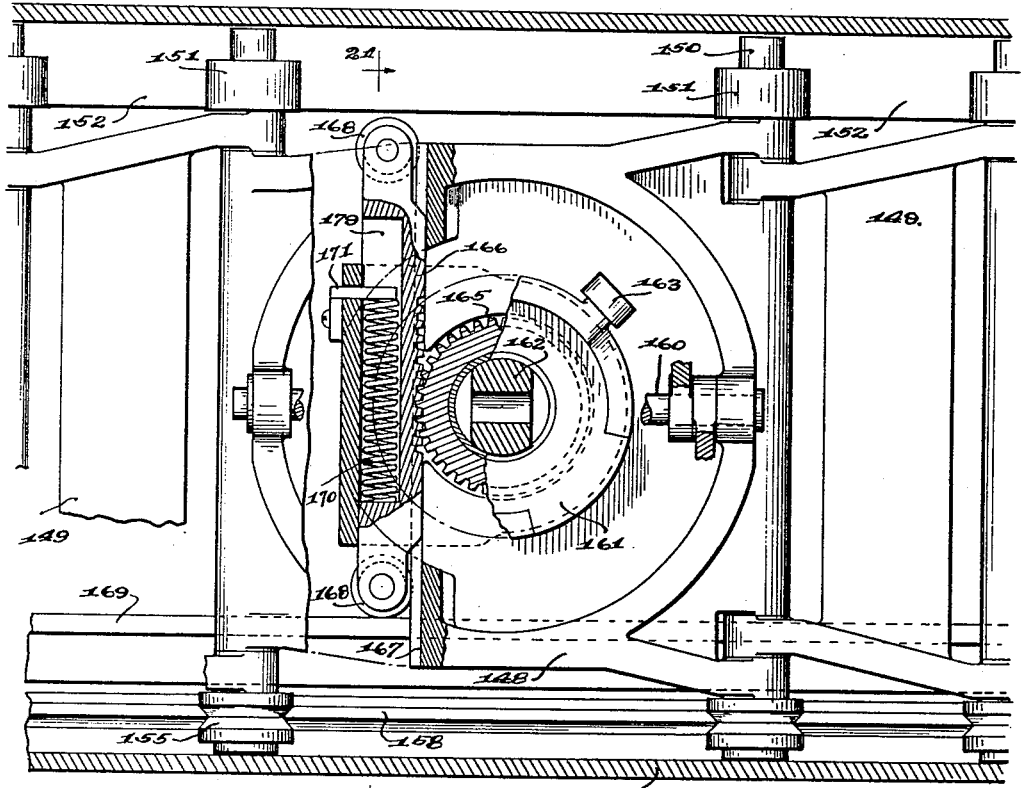
Figure 21:
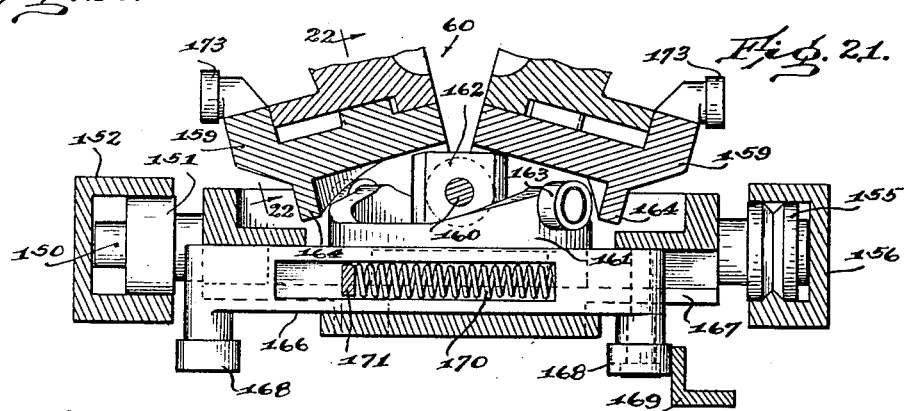
Figure 22:
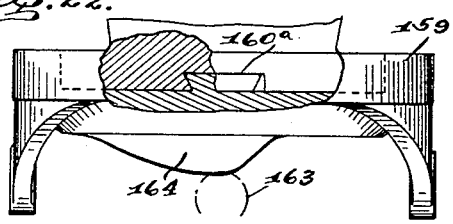
Figure 23:
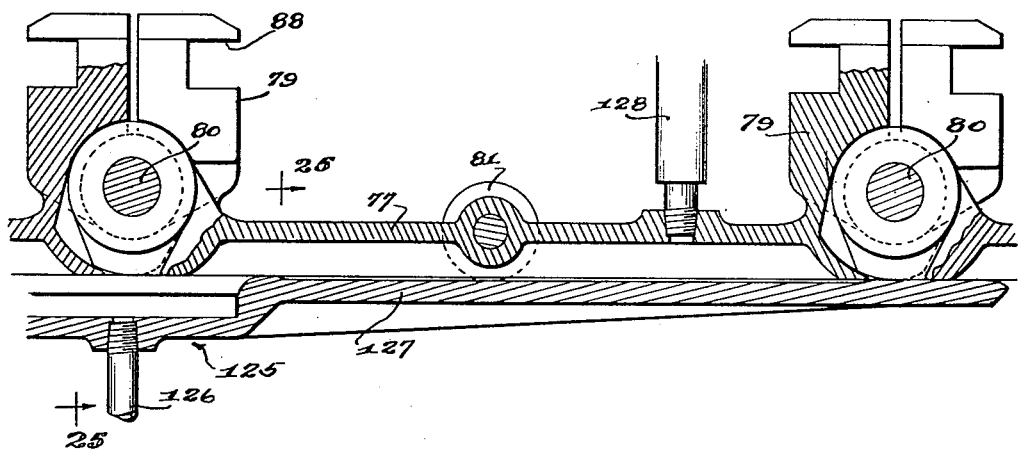
Figure 24:
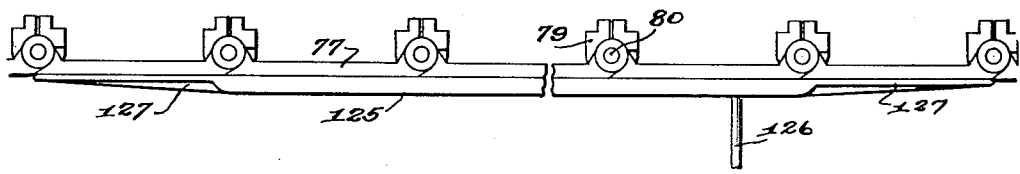
Figure 25:
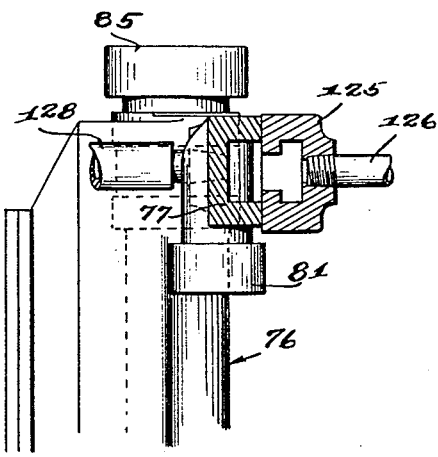
Figure 36:
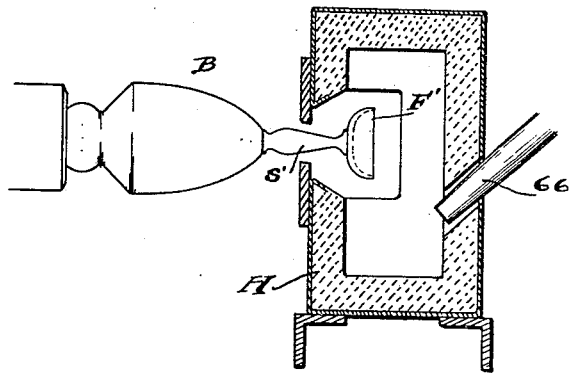
Figure 37:
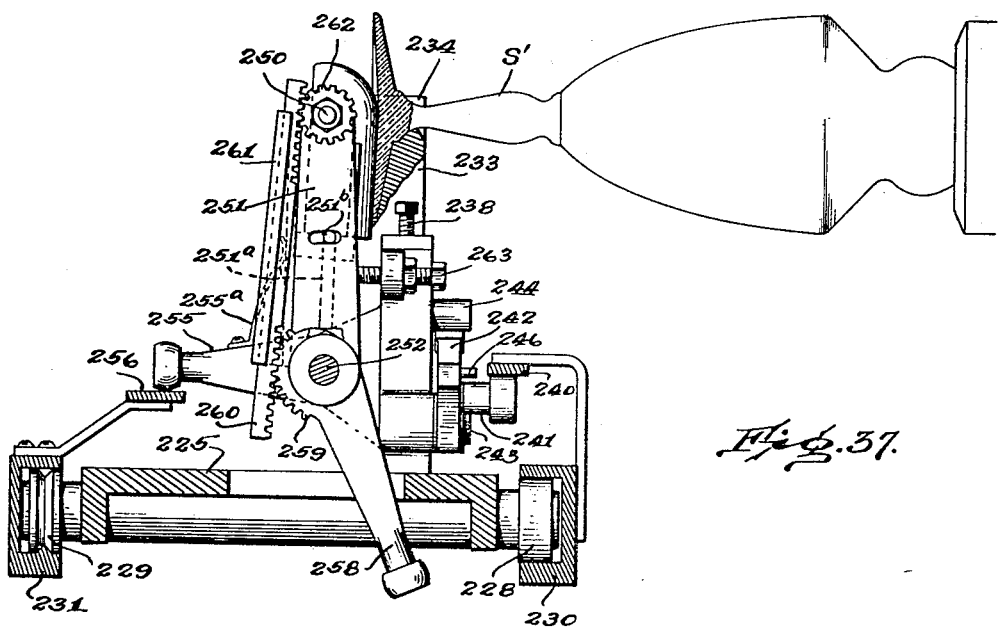
Figure 38:
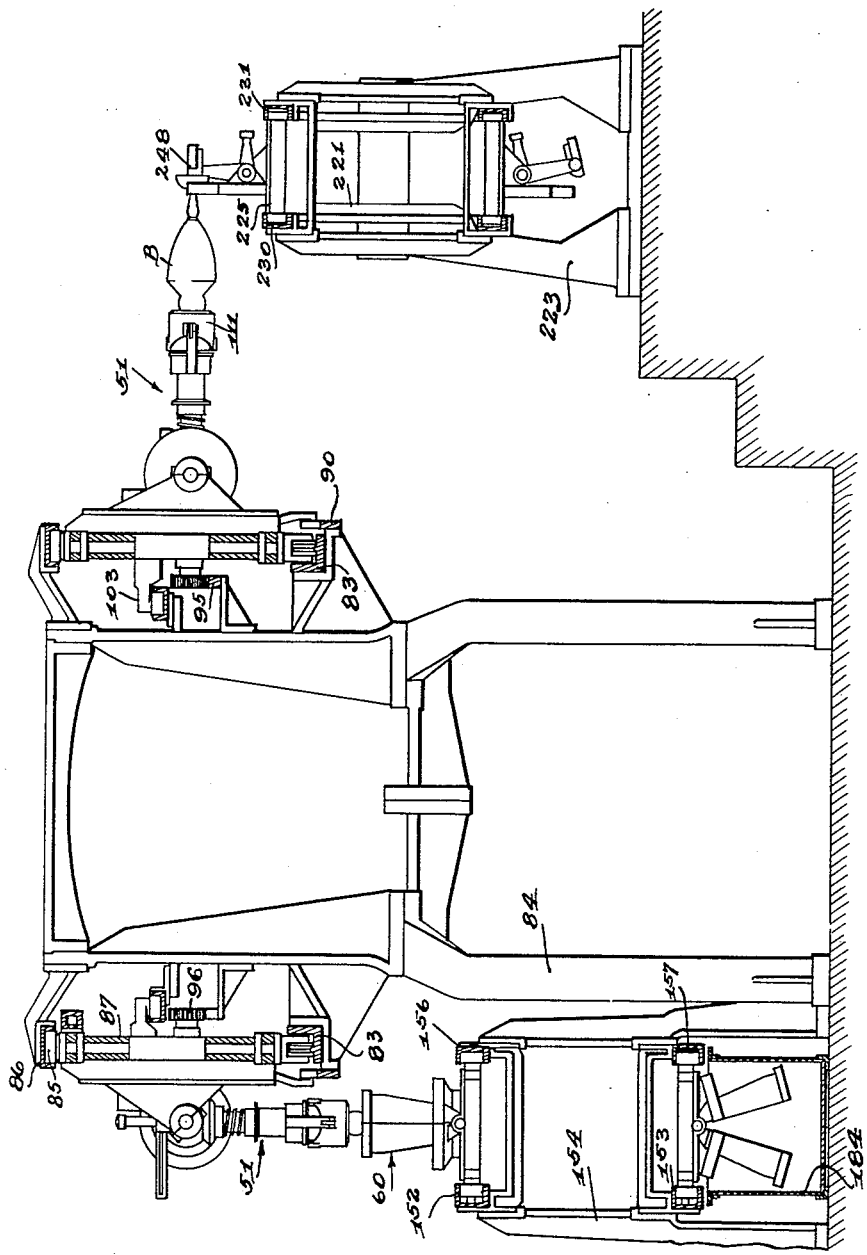
Figure 39:
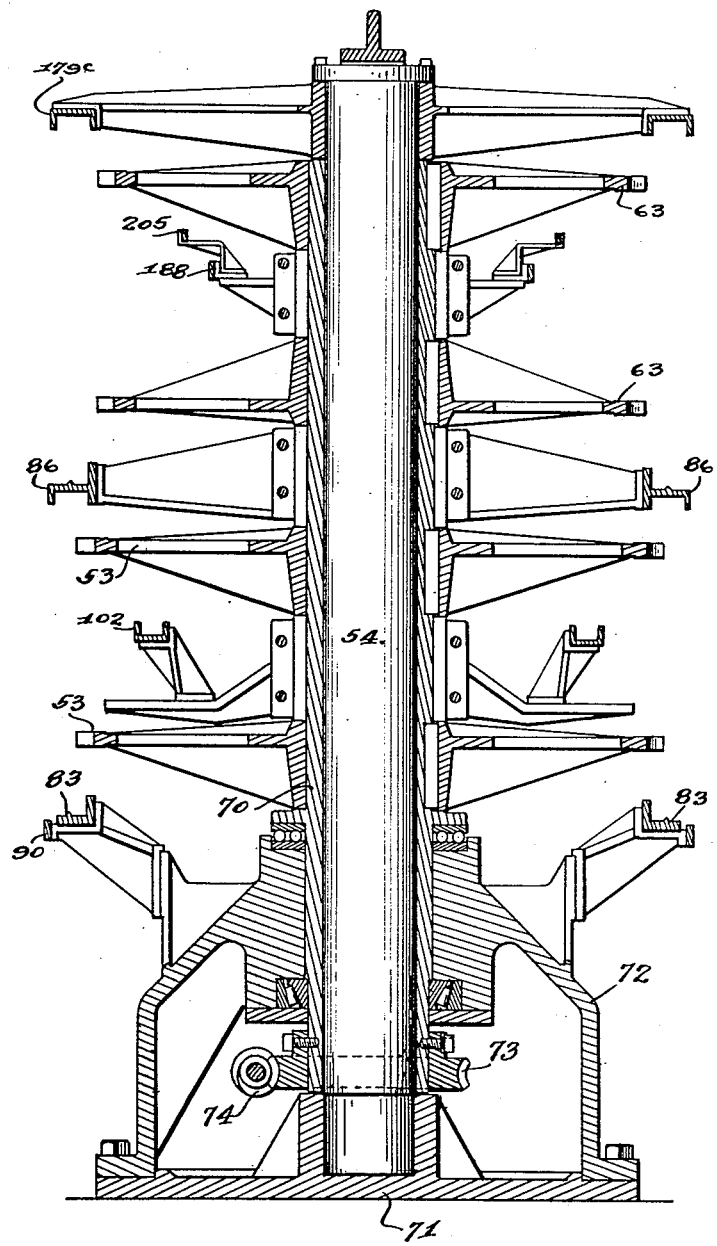

Fig. 6 indicates the preliminary foot and stem-forming operations;

Fig. 7 illustrates the pressing operation;

Fig. 8 illustrates the reheating of the cup foot;

Fig. 9 indicates the beginning of the reshaping operation for straightening the foot;

Fig. 10 shows the method by which the straightening of the foot is completed;

Fig. 11 shows the formed ware as it is discharged from the spindle;

Fig. 12 is a sectional elevation showing a spindle and its associated mechanism with the spindle in the charge-receiving position, the section being taken approximately at the line 12—12 on Fig. 1;

Fig. 13 is a vertical section through one of the spindles;

Fig. 14 is a horizontal section at the line 14—14 on Fig. 13;

Fig. 15 is a sectional elevation showing an inverted spindle and a finishing mold in position to be closed about the charge of glass suspended from the spindle, the section being taken at the line 15—15 on Fig. 1;

Fig. 16 is a part-sectional plan view of a portion of the chain of spindle units, the right-hand portion of the view also showing finishing mold units beneath the spindle units;

Fig. 17 is a part-sectional plan view of the endless chain of finishing mold units;

Fig. 18 is a part-sectional elevation of a portion of the chain of finishing mold units;

Fig. 19 is a vertical section at the line 19—19 on Fig. 18;

Fig. 20 is a part-sectional plan view of a portion of the finishing mold carrier chain, showing particularly mechanism for opening and closing a finishing mold;

Fig. 21 is a vertical section at the line 21—21 on Fig. 20;

Fig. 22 is a sectional detail view taken at the line 22—22 on Fig. 21;

Fig. 23 is a fragmentary sectional plan view of the spindle chain and means for conducting blowing air to the spindles;

Fig. 24 is a plan view of the same on a smaller scale;

Fig. 25 is a vertical section at the line 25—25 on Fig. 23;

Fig. 26 is a fragmentary front elevation showing two spindle units in cooperative relation with two of the stem and foot molds and their operating mechanism;

Fig. 27 is a part-sectional plan view of a portion of the chain of press molds and cooperating mechanisms;

Fig. 28 is a sectional side elevation illustrating a spindle and press mold, with the latter in position to receive a charge of glass, the view being taken substantially at the line 28—28 on Fig. 1;

Fig. 29 is a vertical section at the line 29—29 on Fig. 1, through the foot and stem pressing mechanism;

Fig. 30 is a part-sectional front elevation of the cup foot reshaping mechanism;

Fig. 31 is a vertical section at the plane of the line 31—31 on Figs. 1 and 30;

Fig. 32 is a detail sectional view of the foot reshaping means at the commencement of the reshaping operation;

Fig. 33 is a similar view showing the position of the reshaping tool at the completion of the operation;

Fig. 34 is a part-sectional plan view of one of the foot reshaping units;

Fig. 35 is a part-sectional rear elevation of the same;

Fig. 36 is a sectional elevation of the foot reheating chamber;

Fig. 37 is a sectional elevation at the line 37—37 on Fig. 34;

Fig. 38 is a vertical section of the machine, the section being taken at the line 38—38 on Fig. 1; and Fig. 39 is a vertical section through the main driving shaft.

*General construction and operation*

The general construction and arrangement of parts and the successive steps in the operation will be understood by reference to Figs. 1 to 11 inclusive. The mechanism comprises a series of individual spindle units 50, each comprising a spindle 51, said units being pivotally connected to form an endless chain or spindle conveyor. This conveyor is trained about driving sprocket wheels 53 (Figs. 1 and 39), mounted to rotate about a column 54, and driving sprocket wheels 55 (Figs. 1 and 12) which rotate about a column 56. An electric motor M drives the spindle conveyor continuously in a clockwise direction as indicated by the arrows (Fig. 1).

Charges of molten glass are gathered by means of a reciprocating ram 57 (Fig. 2) having plural mold cavities 58. The ram gathers its charges or blanks C from a gathering tank 59, drops them two at a time onto the spindles 51 which serve as holders on which the blanks are held throughout the development of the tumbler. Each spindle as it advances beyond the gathering zone is inverted to a depending position while the blank is being developed in the open (Fig. 3). The inverted blank is received in a blow mold 60 (Figs. 4 and 15), herein referred to as the finishing mold, in which it is blown to form the bowl B of the tumbler. The finishing molds are mounted to travel on an endless conveyor and move in synchronism with the spindles as hereinafter described. The gathering and development of the blanks and blowing thereof in the finishing molds 60 corresponds in general to the operations of manufacturing tumblers by a machine such as disclosed in the patent to Kadow, 1,527,556, February 24, 1925, now commonly known as the Westlake machine.

Each spindle, carrying a blank after it has been blown in the finishing mold to form a bowl B, is reinverted (Figs. 1 and 5) and then brought into register with a stem and foot-forming mold 61. Mold units 62 (Fig. 1), each comprising a mold 61 and cooperating mechanism, are connected to form an endless chain conveyor trained over sprocket wheels 63 and 64 mounted for rotation respectively about the column 54 and a column 65. When a mold 61 is brought into register with a bowl B (see Fig. 28) a gob F is dropped into the mold (Fig. 6) and thereafter pressed in the mold to form a stem and foot, and at the same time weld the stem to the bowl (Fig. 7) as more fully described hereinafter. This completes the formation of the tumbler.

The mold 61 is then opened and the spindle with the molded tumbler supported thereon is swung outward to horizontal position and while in said position advanced along a preheating chamber H (Figs. 1 and 8) with the foot extended into the chamber where it is reheated and softened for final shaping. Burners 66 supply heat to said chamber. After this reheating each foot is reshaped to its final form by a foot straightening or reshaping mechanism S (Figs. 1, 9 and 10). The reshaping devices are connected to form an endless chain which advances in synchronism with the spindles. After the foot reshaping operation, the completed article is released from the spindle and thereby discharged from the machine.

*Driving mechanism*

The electric motor M (Fig. 1) has a driving connection 40 with a line shaft 41 which in turn is connected through suitable trains of gearing to all of the endless chain conveyors so that the various parts are all driven in synchronism. The connections between the line shaft 41 and the finishing mold conveyor comprises a gear train 42. The driving connections between the line shaft and the conveyor for the reshaping devices S comprises a train of gearing 43. Worm wheels 44, 45 and 73 driven from the line shaft are connected respectively to tubular drive shafts mounted for rotation about the columns 56, 65 and 54 respectively.

The driving connections between the motor M and the spindle chain or conveyor comprise a tubular drive shaft 70 (Fig. 39) mounted for rotation about the stationary column 54. The latter is mounted on a supporting structure comprising a base plate 71 and a hollow frame or casing 72 bolted thereto. The worm gear 73 is keyed to the drive shaft within said casing and is driven by a worm 74 on the line shaft 41.

The driving sprocket or gear wheels 53 are keyed to the drive shaft 70. The spindle conveyor is trained over these wheels and over the sprocket or gear wheels 55 which, as shown in Fig. 12, are keyed to the tubular shaft 75 journalled on the stationary column 56. The drive sprocket wheels 63 for the stem and foot-forming molds are also keyed to the drive shaft 70 (Fig. 39), being positioned above the sprockets 53 which drive the spindle conveyor.

Spindle units

Referring particularly to Figs. 12 to 16 and 23 to 26, each spindle unit comprises a supporting frame 76 forming a link of the spindle conveyor chain. This frame is vertically disposed and comprises an upper horizontal bar 77, a lower horizontal bar 78, and vertical frame members or side bars 79. The frames 76 are pivotally connected by pintles 80 (Figs. 16, 23). The upper and lower cross-bars 77 and 78 carry rolls 81 which mesh with notched lugs 81ᵃ of the sprocket wheels 53 and 55. The spindle conveyor is supported and guided during its travel by rolls 82 mounted at the lower ends of the pintles 80 and running on stationary tracks 83. Guide rolls 85 at the upper ends of the pintles 80 run in tracks 86 and serve to hold the links or frames 76 in upright position. The tracks are supported on brackets on a framework 84 (Figs. 15, 38).

Each spindle is mounted on a slide frame or carrier 87 which in turn is mounted for a limited up and down movement in guideways 88 in the frame 76. The slide frame 87 carries a roll 89 which runs on a cam track 90. The up and down movements of the spindle carrier 87, under the control of the cam track 90, cause the opening and closing movements of the spindle jaws as hereinafter described.

The spindle comprises a tubular shaft 91 which is journalled for rotation about its longitudinal axis in a hub 92 formed on a horizontal hub shaft 93 journalled in trunnions 94 on the spindle carrier frame 87. The shaft 93 is rotatable about its axis through an angle of at least 180° for swinging the spindle from an upright position (Figs. 12, 13) to an inverted depending position (Fig. 15). The rotation of the spindle about its axis is controlled by a stationary rack 95 on which runs a gear 96 keyed to one end of a horizontal shaft 97 journalled in the spindle carrier frame 87. A bevel pinion 98 on the opposite end of the shaft 97 runs in mesh with a bevel gear 99 mounted concentric with and keyed to a bevel pinion 100 which is journalled for rotation on the hub shaft 93. The pinion 100 runs in mesh with a pinion 101 keyed to the spindle shaft 91. It will be seen that the rack 95 will operate through the train of gears just described to rotate the spindle about its longitudinal axis.

The swinging movement of the spindle about the axis of the hub shaft 93 is effected by a stationary cam 102 (Fig. 15) on which runs a cam roll 103ᵃ carried by a slide bar 103 mounted on the spindle carrier frame 87 for lengthwise movement. The slide bar 103 carries at its outer end a gear 104 which runs on a rack bar 105 having a fixed mounting on the frame 87. A rack bar 106 in engagement with the gear 104 diametrically opposite the rack 105 is mounted for lengthwise movement by means of a slot and pin connection with the frame 87. The rack bar 106 has rack teeth 107 which engage a gear wheel 108 (Figs. 14 and 15) keyed to the hub shaft 93. It will be seen that reciprocation of the slide bar 103 under the control of the cam 102 will operate through the gearing just described to rotate the hub shaft 93 and thereby swing the spindle about the axis of the hub shaft for inverting and reinverting the spindle.

The spindle shaft 91 is formed at its outer end with a tubular head or extension 109 within which is mounted a cup 110 or blank mold for receiving the blank or gob C of molten glass. Means for attaching the blank to the spindle comprises a pair of spindle jaws 111 hinged to swing about pivot pins 112 in the head 109. The means for swinging the jaws includes a sleeve member 113 mounted on the spindle shaft for lengthwise movement thereof, said sleeve member carrying arms 114 having link connections with the spindle jaws (Fig. 12). The closing movement of the jaws is effected by a coil spring 115 held under compression between the inner end of the sleeve 113 and the hub of the gear 101.

When the spindle is in upright position the jaws are opened by means including a cross-bar 116 secured to the frame 76, said cross-bar carrying lugs or rolls 117 arranged to project over a flange 118 formed in the sleeve 113. When the spindle frame 87 is lifted (Fig. 12), the cross-bar 116 holds the sleeve 113 from moving upward with the spindle and thereby operates to open the spindle jaws. The opening of the jaws to release the blank when the spindle is in its inverted depending position (Fig. 15) is effected in like manner by a cross-bar 116ᵃ fixed on the frame 76 and carrying rolls which engage beneath the collar 118 when the latter is in its depending position. It will be noted that the spindle may be rotated about its longitudinal axis while in any rotative position with respect to the axis of the hub shaft 93. This permits the combined rotative and swinging movements necessary for the proper development of the charge of glass.

The spindle is so mounted that it may readily be removed from the hub at any time for making repairs or for replacement. The means for removably holding the spindle comprises a substantially U-shaped member 120 (Figs. 13 and 14), the ends 121 of which project into the hub on opposite sides of the spindle shaft 91 and enter an annular groove 122 in the periphery of said shaft. A latch 123 pivoted on the hub prevents accidental removal of the holding member 120 while the machine is operating.

Air for developing the blank in the open and for expanding it in the finishing mold is supplied to the spindles from a stationary supply chamber 125 (Figs. 23, 24 and 25) which is positioned to extend along the upper bars 77 of the spindle supporting frames, said bars having a sliding contact with the walls of the air chamber. Air under pressure is supplied to the chamber from any suitable source through a pipe 126. Pads 127 at the end of the chamber prevent the escape of air as the links pass beyond the said chamber. The bars 77 are channel-shaped to permit the passage of air therealong from the chamber 125 to a flexible pipe 128 which leads therefrom to one of the trunnions 94 (Figs. 26 and 14) and communicates through a passage 129 in the hub with an annular groove on the hub shaft 93. Said groove is in communication through radial openings 130 with a central bore 131 extending through the hub shaft to an annular groove 132 in the hub. The groove 132 surrounds the spindle shaft and is in communication through radial channels 132ª with a central bore 133 extending lengthwise through a plunger rod 134 to the plunger head or tip 135 and opening through the latter to the cup 110. Air for developing the blank is thus supplied from the chamber 125 through the passageway just described to the mold or cup 110 for developing the blank while the plunger is in its retracted position (Fig. 13). When the plunger is projected, the air supply is cut off at the opening 132ª. The plunger is normally held in its retracted position by a coil spring 136 and is periodically projected to the dotted line position (Fig. 13), for forming an initial blow opening in the blank, by means of a stationary cam 137 which engages a cap 138 on the lower end of the plunger rod. This formation of the initial blow opening takes place immediately after the blank has been attached to the spindle. This is followed by the inverting movement of the spindle and simultaneous development of the blank in the open by air supplied from the chamber 125 (Figs. 23 to 25).

Finishing mold mechanism

After the blanks carried on the spindles have been developed in the open and the spindles inverted to a depending position (Fig. 15), the blanks are enclosed in the finishing molds 60 in which they are blown to finished form. The finishing mold mechanism is shown in detail in Figs. 15 and 17 to 22 inclusive. The finishing mold units are connected to form an endless chain traveling in a closed path beneath the inverted spindles. The chain is trained over traveling sprocket wheels 140 mounted on a horizontal drive shaft 141, and driven sprocket wheels 142. The chain of finishing molds is driven by the motor M, as before noted, through the train of gearing 42 (Fig. 1). This train includes a worm shaft 143 (Fig. 18) and worm gear 144 which drives a vertical shaft 145 operating through bevel gears 146 and 147 to drive the shaft 141.

Each finishing mold unit comprises a base plate or member 148, said plates being connected by links 149. Said plates and links are pivotally connected together by pivot pins 150. Each pivot pin carries a roll 151 at one end thereof, running on upper and lower stationary tracks 152 and 153 respectively. Said tracks are mounted on a supporting framework 154. Grooved rolls 155 on the opposite ends of the pivot pins run on upper and lower tracks 156 and 157 on the frame 154, the tracks being formed with a rib 158 to engage the groove rolls and prevent lateral movement of the mold units.

Each of the molds 60 comprises separable sections removably mounted on carrier plates 159 hinged to swing about a pivot pin 160 for opening and closing the mold. The mold sections are secured to the plates 159 by beveled tongue and groove connections 160ª (Fig. 22). The pivot pin 160 extends lengthwise of the conveyor, permitting the mold halves to swing laterally, said pivot pin being mounted on the base plate 148. The opening and closing movements of the mold are controlled by a plate or disk 161 mounted to oscillate horizontally about a post 162 formed on the base plate 148. The plate 161 has mounted on its periphery, at diametrically opposite points, cam rolls 163 arranged to engage cams 164 formed on the lower faces of the mold-carrying plates 159. Means for rotating the disk 161 includes a gear 165 attached to the disk on the lower face thereof and a slide bar 166 having rack teeth to engage the gear 165. The slide bar is mounted to reciprocate lengthwise in guideways 167 formed on the base plate 148 and carries cam rolls 168 at its ends to run on stationary cam tracks 169. A coil spring 170 is mounted in the slide bar 166 and held under compression between the slide bar and a stop 171. The spring serves to rotate the gear 165 in a counter-clockwise direction (Fig. 20) for closing the mold.

Each finishing mold at the end of the blowing period is opened by means of one of the cams 169 operating to move the slide 166 to the position shown in Figs. 20 and 21, thereby rotating the disk 161 in a clockwise direction and thus withdrawing the cam rolls from the cams 164. Coincident with this withdrawal of the cam rolls, a pair of cams 172 (Figs. 18 and 19) engage rolls 173 on the holders 159 for positively holding the mold open. The cams 172 are supported on the upper and lower tracks and extend around the driving wheels 140 and hold the molds open continuously during their return to the driven sprocket wheel 142 at the opposite end of the conveyor. The molds remain open until the blank transfer point is reached and then close around the partly expanded blank C (Fig. 15).

The finishing molds while returning and in their inverted position travel through a tank 174 in which water is circulating, with the molds submerged for cooling and lubricating purposes. The blank when finally blown in the finishing mold takes the form of a relatively thin walled bowl, preferably having a rounded lower end or bottom to which a foot or footed stem may be attached. When the bowl has thus been blown and is released from the finishing mold, the spindle by which it is carried is reinverted by the cam 102 (Fig. 15) operating as heretofore described. When thus swung to upright position, the spindle is brought into alignment with stem-forming apparatus positioned above the spindle conveyor for cooperation therewith.

Stem and foot-forming mechanism

Referring to Figs. 1 and 26 to 29 inclusive, the stem and foot-molding mechanism will now be described. As before noted, the stem and foot-forming units 62, each comprising a mold 61, are connected in an endless chain trained over the sprocket drive wheels 63 and 64. Each unit comprises a supporting frame 175 forming one link of the chain, said links being pivotally connected by vertical pivot rods 176. Each said frame 175 includes upper and lower horizontal cross-bars 177 and vertical side bars or frame members 178. The cross-bars carry rolls 179 intermediate their ends which engage recessed bearing lugs 180 in the driving wheels 63 and 64 and provide a driving connection. Rolls 179ª at the lower ends of the pivot rods 176 run on the upper surfaces of the rails or tracks 86 on which also run the rolls 85 as above described. Rolls 179ᵇ on the upper ends of the pivot rods, run on a channel rail 179ᶜ.

Each mold 61 is carried on a slide plate or carrier 181 mounted on the frame 175 for adjustment up and down thereon. The plate is supported and guided in guideways 182 formed in the frame members 178. Means for adjusting the slide plate vertically comprises a rod 183 journalled in the upper cross-bar 177 and having a screw-threaded connection with a sleeve 184 carried on the slide plate 181. The lower end of the rod bears on a stud which carries the roller 179 running on the lower sprocket wheels. The rod is rotated by a hand wheel 185 for adjusting the slide 181 and mold thereon up and down.

The mold 61 comprises separable sections carried on a pair of arms 186 mounted to swing about a vertical pivot pin 187 on the slide 181 for opening and closing the mold. The opening and closing movements of the mold sections are controlled by a stationary cam 188 on which runs a cam roll 189 carried on a slide block 190. The slide is mounted to reciprocate in a guideway 191 in a bracket arm 192 on the mold carrier plate 181. A slide block 193, also mounted in the guideway 191, carries a rod 194 (Fig. 29) having a sliding connection with the slide block 190. A coil spring 195 mounted on the rod 194 is held under compression between the slides 190 and 193. A pair of links 196 is pivoted at one end to the mold arms 186 and at their opposite ends are connected by a pivot pin 197 to the slide 193. It will be seen that when the roll 189 is moved outwardly, that is, toward the mold, by the cam 188, it operates through the connections just described to close the mold and hold it closed under spring pressure.

A press plunger 200, for pressing and shaping the charge of glass in the mold, is carried at the lower end of a stem 201, telescopically connected with a hollow plunger rod 202. A coiled compression spring 203 within the rod 202 yieldingly holds the plunger at the limit of its downward movement relative to the rod. The plunger rod is mounted for vertical sliding movement in an arm 204 mounted to swing horizontally about the pivot pin 187 for swinging the plunger into and out of alignment with the mold. The swinging movement of the arm 204 is under the control of a stationary cam 205 on which runs a cam roll 206 on the free end of a rock arm 207, the other end of which is pivoted at 208 to a bracket arm 209 on the mold carrier 181. A link 210 provides a connection between the rock arm 204 and the arm 207. When the cam 205 draws the cam roll 206 inwardly or toward the column 54, it operates to swing the plunger over and into register with the mold.

The plunger rod 202 is adjustable in length by means of a threaded section 211. A roll 212 on the upper end of the plunger rod runs on a stationary cam 213 which controls the up and down movement of the plunger. The cam 213 has an adjustable connection 214 with a stationary bracket 215, permitting the height of the cam to be adjusted. A coil spring 216 reacts between the plunger rod and the arm 204 for holding the roll 212 against the cam. A cap 217 slidably mounted on the stem 201 is adapted to seat on the upper end of the mold when the plunger rod is lowered. The cap may be recessed to form a seat for the rim of the mold and securely hold the mold sections closed during the pressing operation. A coil spring 218, held under compression between the arm 204 and the cap 217, holds the cap in its downward position relative to the stem 201 when the plunger is lifted, permitting the cap to seat on the mold before the plunger enters the mold cavity. The coil spring 203 permits the plunger to be held with a yielding pressure during the pressing operation.

The charges of glass or gobs F (Fig. 28) may be supplied by any approved or conventional form of gob-feeding mechanism which gathers its charges from the tank or container 220 (Fig. 1) and delivers them automatically to the molds. The gob is dropped into the mold as indicated in Fig. 28 while the plunger is at one side of the mold. The cam 205 then operates to swing the plunger over the mold. A spindle with a blown bowl B thereon has by this time been brought beneath and into line with the mold 61 and the latter closed to embrace the upper end of the bowl. The cam 213 now lowers the plunger rod, causing the cap 217 to seat on the mold and lowers the plunger into the mold, compressing the molding charge of glass to shape the stem and foot and at the same time presses the stem against the bowl B and welds the stem to the bowl. Thereafter the plunger is lifted and the mold 61 is opened, leaving the tumbler supported by the spindle alone.

*Foot-reshaping apparatus*

As the spindles advance beyond the stem and foot-molding mechanism, they are swung outwardly to a horizontal position so that the footed stems can travel through the foot-reheating chamber H, thereby reheating the feet so that they may be reshaped to their final form. The reshaping mechanism is illustrated in detail in Figs. 30 to 38 inclusive. This mechanism comprises foot-reshaping units connected in an endless chain and trained over driving wheels 221 on a drive shaft 222 journalled in a supporting framework 223.

Each reshaping unit comprises a base plate 225, said plates being connected by links 226 in chain formation, the links and plates being connected by pivot rods 227 (Fig. 30). Each pivot rod has mounted thereon rolls 228 and 229 at opposite ends thereof. The rolls 228 run on tracks 230. The rolls 229 are grooved and run on correspondingly ribbed tracks 231. Lugs 232 on the driving wheels engage the rolls 228, 229.

Each unit comprises a supporting block 233, preferably of carbon, formed with a recess 234 to receive the stem S' of the tumbler and support it while the foot F' is being reshaped. The block 233 is removably supported on a holding frame 235 mounted for up and down movement in vertical guideways in standards 236 and 237 on the base plate 225. The upward movement of the block 233 is adjustably limited by a stop screw 238. A coil spring 239 surrounding the screw 238 is held under compression for lowering the frame 235. Said frame is lifted periodically by a stationary cam 240 operating through an arm 241 and lever 242. The lever is pivoted on a stud 243 on the standard 237. One arm of the lever engages beneath a roll 244 on the frame 235. The arm 241 is pivoted at 245 to the lever and held against a stop pin 246 by means of a coil spring 247. This provides a yielding connection, permitting the frame 235 to be held firmly against the stop pin 238.

The foot F', which is given a cup-shaped formation in the mold, is reshaped or ironed out to give it a substantially flat bottom by means of a forming block 248. This block is mounted in the outer end of a substantially U-shaped arm or bracket 249 (Fig. 34), the other end of which is fixed to a pivot rod 250 journalled in the upper end of a vertically disposed rock arm 251. The lower end of the rock arm 251 is loosely connected to a rock shaft 252 journalled in bearing blocks or standards 253 and 254 carried on the base plate 225. A rod 251ᵃ fixed on the shaft and extending upward therefrom has its upper end projected into a slot 251ᵇ in the arm 251. The shaft 252 is rocked, for causing the rod 251ᵃ to swing the arm 251 toward and from its operative position, by means of a rock arm 255 fixed to the rock shaft and carrying a roll running on a cam 256. A leaf spring 255ᵃ on the rock arm 255 bears against the arm 251. The shaping tool 248 is rotated about its pivot by means of a cam 257 operating through mechanism including a rock arm 258 loosely mounted on the shaft 252 and formed with a gear segment 259 which engages rack teeth on the lower portion of a rack bar 260. Said rack bar is mounted for up and down movement in a guideway 261 on the arm 251. Rack teeth on the upper portion of the rack bar engage a pinion 262 attached to the pivot shaft 250.

The operation of the foot-reshaping mechanism is as follows:

When a spindle carrying a tumbler is brought into position over a reshaping unit, the frame 235 and supporting block 233 are lifted by the cam 240 to the Fig. 37 position in which the stem S' is supported on the block 233. The spindle carrying the tumbler is rotated continuously during the reshaping operation. The cam 256 next operates to swing the arm 251 against an adjustable stop 263, thereby bringing the shaping tool 248 into engagement with the cup-shaped foot (Fig. 32). The cam 257 then operates to slowly swing the rock arm 258 to the right (Fig. 37), thereby operating the rack bar 260 to swing the forming tool about its pivot 250 from the Fig. 32 position to the Fig. 33 position while held against the rotating foot with a yielding pressure transmitted through the spring 255ᵃ, thereby gradually straightening the foot and giving it its finished form. The block 233 is formed with a recess 233ᵃ in which the foot is molded. After the foot has been given its finished shape, the arm 251 is withdrawn and the supporting block 233 lowered, leaving the tumbler supported in the spindle which may then be swung down to a depending position and the spindle jaws opened to discharge the tumbler (Fig. 11).

Modifications may be resorted to within the spirit and scope of the appended claims.

I claim:

1. Apparatus for forming hollow glassware which comprises a holder, means for causing said holder to travel in a closed path and to be brought thereby periodically to a blank receiving station, said holder comprising means for attaching a blank of plastic glass to said holder at said station, means to mold the blank after passing beyond said station, means for molding a second blank and attaching it to said first molded blank while the latter is still attached to said holder, a reheating oven through which a portion of the composite article formed by said blanks is carried for reheating, and means for reshaping the article after the reheating and while still attached to said holder.

2. Apparatus for forming stemware comprising a holder, means for causing said holder to travel in a closed path, said holder comprising means for attaching a blank of plastic glass to the holder, a mold, means for introducing the blank into the mold, means for blowing the blank to form a bowl within the mold while still attached to said holder, and means for molding a second blank to form a stem and for welding the stem to said bowl while the latter is attached to the holder.

3. Apparatus for forming stemware comprising a spindle conveyor, a spindle carried thereby, means for driving the conveyor and causing the spindle to travel in a closed path, said spindle comprising means for attaching a blank to the spindle, a blow mold, means for closing the blow mold about the blank, means for blowing the blank in the mold to form a bowl, means for causing the mold to travel with the spindle during said blowing of the blank therein, and means for molding a second blank and welding it to said bowl while the latter is still attached to the spindle.

4. Apparatus for forming stemware comprising a spindle conveyor, a spindle carried thereby, means for driving the conveyor and causing the spindle to travel in a closed path, said spindle including means for attaching a blank to the spindle, a blow mold, means for closing the blow mold about the blank, means for blowing the blank in the mold to form a bowl, means for causing the mold to travel with the spindle during said blowing of the blank therein, means for molding a second blank to form a footed stem, means for welding said stem to the bowl while the latter is attached to the spindle, and means for reshaping the foot during the travel of the spindle and while the molded article remains attached thereto.

5. The combination of a plurality of spindle units connected to form an endless chain conveyor, means for driving said conveyor and causing the units to travel in a closed path, each said unit comprising a spindle, means for delivering blanks of plastic glass to the spindles in succession while the spindles are in upright position, said spindles including means for attaching the blanks to the upright spindles, means for swinging the spindles downward to an inverted depending position, means for developing the blanks in the open during said inverting movement, blow molds arranged to enclose the blanks on the depending spindles, means for causing the blow molds to travel a certain distance with the spindles, means for blowing the blanks in the blow molds and thereby forming each blank into a bowl, means for molding additional blanks to form stems for attachment to the bowls, and means for welding said stems to the bowls while the latter remain attached to the spindles and are traveling therewith.

6. The combination of a plurality of spindle units connected to form an endless chain conveyor, means for driving said conveyor and causing the units to travel in a closed path, each said unit comprising a spindle, means for delivering blanks of plastic glass to the spindles in succession while the spindles are in upright position, said spindles including means for attaching the blanks to the upright spindles, means for swinging the spindles downward to an inverted depending position, means for developing the blanks in the open during said inverting movement, blow molds arranged to enclose the blanks on the depending spindles, means for causing the blow molds to travel a certain distance with the spindles, means for blowing the blanks in the blow molds and thereby forming each blank into a bowl, means for reinverting the spindles with the molded bowls thereon, means for forming footed stems, means for welding the footed stems to the said bowls, means for swinging the spindles to a substantially horizontal position, a reheating oven through which the footed stems are carried with the spindles while in said horizontal position and by which the footed stems are reheated, means for reshaping the reheated stems, and means for rotating the spindles during said reheating and reshaping operations.

7. Apparatus for forming footed stemware comprising an endless chain of spindle units, each unit comprising a spindle including blank gripping means, means for inverting the spindle from an upright to a depending position, and means for rotating the spindle about its longitudinal axis, blow molds, footed stem molds, a reheating oven and foot reshaping mechanism, said parts being coordinated and cooperating to effect the following operations for forming the stemware, viz., attaching plastic blanks to the upright spindles, developing the blanks in the open during the inverting movement of the spindles, blowing the blanks in the blow molds to form molded bowls, molding footed stems and welding them to the bowls, reheating the stems in said oven, and reshaping the reheated stems.

8. Apparatus for forming hollow glassware comprising a plurality of spindle units, each comprising a supporting frame or base, said frames being pivotally connected to form an endless chain with each frame forming a link of the chain, means for driving said chain and causing the said units to travel in a closed path, spindle carriers mounted on said frames for sliding movement in a direction transverse to their path of travel, a hub shaft journalled in each said carrier and extending in the direction of travel of said chain, a spindle mounted for rotation in said hub shaft and extending perpendicular thereto, means for rotating said hub shaft for inverting and reinverting the spindle, and mechanism for rotating the spindle about its longitudinal axis, said spindle rotating mechanism being operative for rotating the spindle while the hub shaft is in any rotative position.

9. The combination of spindle units connected to form an endless chain, means for driving the chain and causing said units to travel in a closed path, each said unit comprising a supporting frame, a shaft journalled in said frame, a spindle carried by said shaft and extending perpendicular thereto, a stationary rack bar, a pinion carried by each said frame and arranged to be driven by said rack bar, gearing forming a driving connection between said pinion and the spindle for rotating the spindle about its longitudinal axis, and separate means for rotating the said shaft about its axis and thereby swinging the spindle about the axis of said shaft.

10. The combination of spindle units connected to form an endless chain, means for driving the chain and causing said units to travel in a closed path, each said unit comprising a supporting frame, a shaft journalled in said frame, a spindle carried by said shaft and extending perpendicular thereto, a stationary rack bar, a pinion carried by each said frame and arranged to be driven by said rack bar, gearing forming a driving connection between said pinion and the spindle for rotating the spindle about its longitudinal axis, and separate means for rotating the said shaft about its axis and thereby swinging the spindle about the axis of said shaft, said last mentioned means comprising a stationary cam, slide bars individual to and carried by said frames and actuated by said cam, and gear trains connecting the slide bars with said shafts.

11. The combination of a plurality of spindle units each comprising a vertically disposed supporting frame, said frames being pivotally connected to form an endless chain, means for driving said chain and causing said units to travel horizontally in a closed path, each said unit comprising a horizontal hub shaft extending in the direction of travel of the chain, a spindle journalled in the hub of said shaft and extending perpendicular thereto, means for oscillating the hub shaft about its axis and thereby inverting and reinverting the spindle, and means for rotating the spindle about its longitudinal axis while the hub shaft is in any position of rotation.

12. The combination of a plurality of spindle units each comprising a vertically disposed supporting frame, said frames being pivotally connected to form an endless chain, means for driving said chain and causing said units to travel horizontally in a closed path, each said unit comprising a horizontal hub shaft extending in the direction of travel of the chain, a spindle journalled in the hub of said shaft and extending perpendicular thereto, means for oscillating the hub shaft about its axis and thereby inverting and reinverting the spindle, and means for rotating the spindle about its longitudinal axis while the hub shaft is in any position of rotation, said means for rotating the spindle including a stationary rack, a pinion carried by the spindle unit and running on said rack, and a gear train between said pinion and the hub shaft including intermeshing bevel gears attached respectively to the hub shaft and the spindle.

13. The combination of a plurality of spindle units each comprising a vertically disposed supporting frame, said frames being pivotally connected to form an endless chain, means for driving said chain and causing said units to travel horizontally in a closed path, each said unit comprising a horizontal hub shaft extending in the direction of travel of the chain, a spindle journalled in the hub of said shaft and extending perpendicular thereto, means for oscillating the hub shaft about its axis and thereby inverting and reinverting the spindle, and means for rotating the spindle about its longitudinal axis while the hub shaft is in any position of rotation, said means for oscillating the hub shaft comprising a stationary cam, a slide carried on said spindle unit and actuated by said cam, and driving connections between said slide and the hub shaft.

14. Apparatus for forming hollow glassware comprising, in combination, a series of spindle units connected to form an endless chain, said chain arranged to travel horizontally in a closed path, each said unit comprising a spindle mounted to swing about an axis extending in the direction of travel of the unit for inverting and reinverting the spindle, each spindle including means for attaching a blank of glass to the spindle, means for developing the blank to hollow form during its inverting movement, a series of blow mold units connected to form an endless chain, means for driving the latter and causing the blow mold units to travel in synchronism with the spindle units, said blow mold units each comprising a partible blow mold, means for closing the blow molds about the blanks while the latter are carried by the inverted spindles, and means for blowing the blanks in the blow molds.

15. Apparatus for forming hollow glass articles comprising a plurality of blow mold units each comprising a horizontally disposed base plate, means pivotally connecting said plates to form an endless chain, and spaced sprocket wheels rotating about horizontal axes and over which said chain is trained, each said unit comprising partible mold sections mounted to swing about an axis extending in the direction of travel of the supporting plate for opening and closing the mold.

16. Apparatus for forming hollow glass articles comprising a plurality of blow mold units each comprising a horizontally disposed base plate, means pivotally connecting said plates to form an endless chain, spaced sprocket wheels rotating about horizontal axes and over which said chain is trained, each said unit comprising partible mold sections mounted to swing about an axis extending in the direction of travel of the supporting plate for opening and closing the mold, and means for opening and closing the mold comprising cams arranged to swing with the mold sections about said axis and a cam-operating element mounted on the base plate for rotation about a vertical axis and arranged to engage and swing said cams.

17. Apparatus for forming hollow glass articles comprising, in combination, a series of mold units connected to form an endless chain, means for driving said chain, each said unit comprising a base plate, partible mold sections mounted on said base plate for swinging movement about a horizontal axis for opening and closing the mold, a rotary disk mounted on said base beneath the mold sections and rotatable about a vertical axis, cams connected to the mold sections, and cam rolls on said disk arranged to engage said cams and operable to effect opening and closing of said mold sections when said disk is rotated.

18. Apparatus for forming hollow glass articles comprising, in combination, a series of mold units connected to form an endless chain, means for driving said chain, said units each comprising a horizontally disposed base plate, partible mold sections, a pivot shaft mounted on the base plate, means for swinging the mold sections about said pivot for opening and closing the mold, said last mentioned means including a rack bar mounted to reciprocate on the base plate, a stationary cam for actuating the rack bar, a pinion driven by the rack bar, cams carried on said mold sections, and means connected to said pinion for rotation therewith and operable to engage said cams for opening and closing the mold.

19. Apparatus for forming stemware comprising, in combination, a spindle conveyor, spindles carried thereby, means for driving the conveyor and causing the spindles to travel in a closed path, said spindles including means for attaching blanks to the spindles, means for blowing each blank to the form of a bowl, press molds, means for causing said molds to travel in register with the bowls while the latter are supported on said spindles, and means for pressing blanks of glass in said molds, thereby forming stems, and concomitantly attaching the stems to the bowls while the bowls are supported on the spindles.

20. Apparatus for forming stemware comprising, in combination, a spindle conveyor, spindles carried thereby, means for driving the conveyor and causing the spindles to travel in a closed path, said spindles including means for attaching blanks to the spindles, means for blowing each blank to the form of a bowl, press molds, means for causing said molds to travel in register with the bowls while the latter are supported on said spindles, means for pressing blanks of glass in said molds, thereby forming stems, and concomitantly attaching the stems to the bowls while the bowls are supported on the spindles, means for thereafter reheating the stems, and means for reshaping the reheated stems while the bowls are still attached to the spindles.

21. Apparatus for forming stemware comprising a spindle including means for attaching a blank thereto, means to mold the blank to form a bowl, means to mold a footed stem and weld it to the bowl while the latter remains attached to the spindle, means to reheat the foot of said stem, and means to reshape the foot while the bowl is still attached to the spindle, said reshaping means including a shaping implement, means for rotating the molded article, a supporting and shaping block by which the stem is supported during rotation, and means for holding said reshaping tool in contact with the rotating foot and swinging the tool into position to reshape said foot while the latter is rotating.

22. Apparatus for forming stemware comprising an endless chain of spindle units, means for driving said chain and causing the units to travel in a closed path, each said unit comprising a spindle, said spindles including means for attaching blanks of glass to said spindles, means for molding said blanks to form bowls, means for molding footed stems and attaching them to the bowls while the latter are carried by the spindles, and means for reshaping said footed stems, said reshaping means including a series of reshaping units connected to form a chain, means for driving the latter and causing the reshaping units to travel with and in operative relation to the ware carried by the spindles, each said reshaping unit comprising a reshaping implement, means for rotating the bowls with the attached stems, and means for causing said implements to reshape the stems during said rotation.

23. Apparatus for forming stemware comprising an endless chain of spindle units, means for driving said chain and causing the units to travel in a closed path, each said unit comprising a spindle, said spindles including means for attaching blanks of glass to said spindles, means for molding said blanks to form bowls, means for molding footed stems and attaching them to the bowls while the latter are carried by the spindles, and means for reshaping said footed stems, said reshaping means including a series of reshaping units connected to form a chain, means for driving the latter and causing the reshaping units to travel with and in operative relation to the ware carried by the spindles, each said reshaping unit comprising a supporting block arranged to support the stem and form a backing for said foot, a rock shaft, a rock arm carried thereby, a shaping block pivotally mounted on the rock arm, means for rocking said rock shaft and moving said shaping block to and from the said foot, and means for swinging said block about its pivot and thereby shaping said foot.

24. The combination of a spindle including means to attach a blank of glass thereto, a blow mold having a bowl shaped mold cavity, means to blow the blank in said mold into the form of a bowl, means for separating the blown blank and blow mold, a press mold, means for bringing it into register with the said bowl while the latter is supported on the spindle and unenclosed, and means to press a blank in the press mold and cause it to weld to the bowl while the latter is in the open.

HAROLD R. SCHUTZ.